(12) United States Patent
Liu et al.

(10) Patent No.: US 12,495,419 B2
(45) Date of Patent: Dec. 9, 2025

(54) TERMINAL APPARATUS, BASE STATION APPARATUS, AND COMMUNICATION METHOD

(71) Applicant: SHARP KABUSHIKI KAISHA, Sakai (JP)

(72) Inventors: Liqing Liu, Sakai (JP); Shohei Yamada, Sakai (JP); Hiroki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 499 days.

(21) Appl. No.: 17/915,083

(22) PCT Filed: Apr. 1, 2021

(86) PCT No.: PCT/JP2021/014836
§ 371 (c)(1),
(2) Date: Sep. 27, 2022

(87) PCT Pub. No.: WO2021/201299
PCT Pub. Date: Oct. 7, 2021

(65) Prior Publication Data
US 2023/0156700 A1 May 18, 2023

(30) Foreign Application Priority Data
Apr. 2, 2020 (JP) .................... 2020-066615

(51) Int. Cl.
*H04W 72/1273* (2023.01)
*H04W 24/08* (2009.01)
(Continued)

(52) U.S. Cl.
CPC ....... *H04W 72/1273* (2013.01); *H04W 24/08* (2013.01); *H04W 72/23* (2023.01); *H04W 76/30* (2018.02)

(58) Field of Classification Search
CPC . H04W 72/1273; H04W 24/08; H04W 72/23; H04W 76/30; H04L 5/0044;
(Continued)

(56) References Cited

U.S. PATENT DOCUMENTS

| | | | |
|---|---|---|---|
| 2012/0063351 A1* | 3/2012 | Kim | H04L 5/0053 370/252 |
| 2021/0160879 A1* | 5/2021 | Lin | H04W 72/0453 |
| 2022/0416987 A1* | 12/2022 | Takeda | H04L 5/0094 |

FOREIGN PATENT DOCUMENTS

| | | |
|---|---|---|
| EP | 3599733 A1 | 1/2020 |
| WO | 2010/131925 A2 | 11/2010 |

OTHER PUBLICATIONS

Remaining Issues on Enhanced UL CG transmission for NR URLLC, R1-2000675, 3GPP TSG RAN WG1 #100, e-Meeting, Feb. 24-Mar. 6, 2020 (Year: 2020).*

(Continued)

*Primary Examiner* — Ayaz R Sheikh
*Assistant Examiner* — David Zhijun Sun
(74) *Attorney, Agent, or Firm* — ScienBiziP, P.C.

(57) ABSTRACT

A method by a user equipment (UE) is described. The method includes receiving, from a base station, information to configure a scheduling cell and scheduled cell(s) for cross-carrier scheduling and to configure carrier indicator field (CIF) value for respective cell, monitoring a first set of PDCCH candidates with a CCE aggregation level (AL) in a first set of CCEs in a CORESET for a first DCI format associated with a first serving cell wherein the first set of CCEs is given at least based on the CIF value of the first serving cell and the first DCI format having a first size is used for an uplink grant Type 2 PUSCH release, monitoring a second set of PDCCH candidates with the CCE AL in a second set of CCEs in the CORESET for a second DCI format associated with a second serving cell wherein the (Continued)

second set of CCEs is given at least based on the CIF value of the second serving cell and the second DCI format has a second size, receiving a PDCCH through a PDCCH candidate for the second DCI format in the first set of CCEs in a case that the first size and the second size are same.

3 Claims, 9 Drawing Sheets

(51) Int. Cl.
 *H04W 72/23* (2023.01)
 *H04W 76/30* (2018.01)
(58) Field of Classification Search
 CPC ..... H04L 5/001; H04L 5/0053; H04L 5/0094; Y02D 30/70
 See application file for complete search history.

(56) References Cited

OTHER PUBLICATIONS

Moderator (Huawei), Sharp, "Correction on UL grant Type 2 PUSCH release for search space sharing", R1-2009637, 3GPP TSG RAN WG1 #103-e, e-Meeting, Oct. 26-Nov. 13, 2020.
Samsung, "Introduction of Ultra Reliable Low Latency Communications Enhancements", R1-1913197, 3GPP TSG-RAN WG1 Meeting #99, Reno, USA, Nov. 18-22, 2019.

* cited by examiner (a): Special fields for single UL grant Type 2 scheduling activation PDCCH validation when a UE is provided a single UL grant Type 2 configuration

| | DCI format 0_0/0_1/0_2 |
|---|---|
| HARQ process number | set to all '0's/0_2 |
| Redundancy version | set to all '0's |

(b): Special fields for single UL grant Type 2 scheduling release PDCCH validation

| | DCI format 0_0/0_1/0_2 |
|---|---|
| HARQ process number | set to all '0's/0_2 |
| Redundancy version | set to all '0's |
| Modulation and coding scheme | set to all '1's |
| Frequency domain resource assignment | set to all '0's for FDRA Type 0, set to all '1's for FDRA Type 1 |

(c): Special fields for single UL grant Type 2 scheduling activation PDCCH validation when a UE is provided multiple UL grant Type 2 configurations

| | DCI format 0_0/0_1/0_2 |
|---|---|
| Redundancy version | set to all '0's |

(d): Special fields for multiple UL grant Type 2 scheduling release PDCCH validation

| | DCI format 0_0/0_1/0_2 |
|---|---|
| Redundancy version | set to all '0's |
| Modulation and coding scheme | set to all '1's |
| Frequency domain resource assignment | set to all '0's for FDRA Type 0, set to all '1's for FDRA Type 1 |

FIG. 3

TERMINAL APPARATUS, BASE STATION APPARATUS, AND COMMUNICATION METHOD

TECHNICAL FIELD

The present disclosure relates to a terminal apparatus, a base station apparatus, a communication method, and an integrated circuit.

BACKGROUND ART

At present, as a radio access system and a radio network technology aimed for the fifth generation cellular system, technical investigation and standard development are being conducted, as extended standards of Long Term Evolution (LTE), on LTE-Advanced Pro (LTE-A Pro) and New Radio technology (NR) in The Third Generation Partnership Project (3GPP).

In the fifth generation cellular system, three services of enhanced Mobile BroadBand (eMBB) to achieve high-speed and large-volume transmission, Ultra-Reliable and Low Latency Communication (URLLC) to achieve low-latency and high-reliability communication, and massive Machine Type Communication (mMTC) to allow connection of a large number of machine type devices such as Internet of Things (IoT) have been demanded as assumed scenarios.

For example, wireless communication devices may communicate with one or more devices for multiple service types. However, current existing systems and methods, for example, which allows DCI format with one usage for UL search space sharing, would offer limited flexibility and efficiency. As illustrated by this discussion, systems and methods according to the prevent invention, supporting DCI format(s) with multiple usages for search space sharing, may improve PDCCH blocking probability and save UE's power consumption for searching PDCCH candidates, and provide the communication flexibility and efficiency.

BRIEF DESCRIPTION OF THE DRAWINGS

FIG. 3 is a diagram illustrating one example 3 of special fields for a single or multiple UL grant Type 2 scheduling activation/release PDCCH validation;

DESCRIPTION OF EMBODIMENTS

Figure 1:
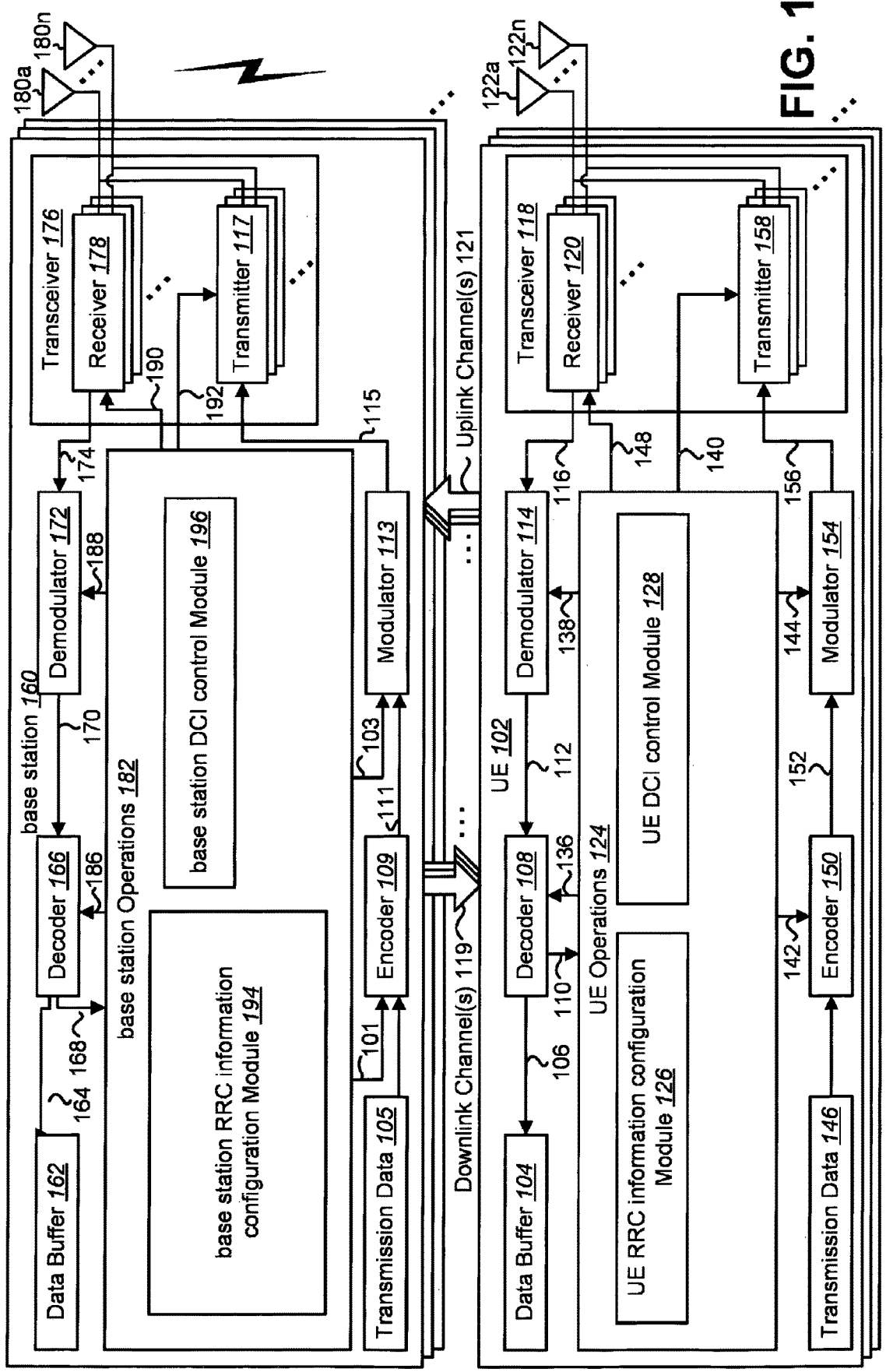
FIG. 1 is a block diagram illustrating one configuration of one or more base stations and one or more user equipments (UEs) in which systems and methods for search space sharing for cross-carrier scheduling may be implemented.

A method by a user equipment (UE) is described. The method includes receiving, from a base station, information to configure a plurality of carriers for cross-carrier scheduling and to configure carrier indicator field (CIF) value for respective carrier, monitoring a first set of PDCCH candidates with a CCE aggregation level (AL) in a first set of CCEs in a CORESET for a first DCI format associated with a first serving cell wherein the first set of CCEs is given at least based on the CIF value of the first serving cell and the first DCI format having a first size is used for releasing PUSCH transmission, monitoring a second set of PDCCH candidates with the CCE AL in a second set of CCEs in the CORESET for a second DCI format associated with a second serving cell wherein the second set of CCEs is given at least based on the CIF value of the second serving cell and the second DCI format has a second size, transmitting, to the base station, a capability to indicate support of search space sharing for operation of carrier aggregation so that the UE can receive a PDCCH through a PDCCH candidate for the second DCI format in the first set of CCEs in a case that the first size and the second size are same.

A method by a base station is described. The method includes transmitting, transmitting, to a user equipment (UE), information to configure a plurality of carriers for cross-carrier scheduling and to configure carrier indicator field (CIF) value for respective carrier, transmitting a first PDCCH candidate with a CCE aggregation level (AL) in a first set of CCEs in a CORESET for a first DCI format associated with a first serving cell wherein the first set of CCEs is given at least based on the CIF value of the first serving cell and the first DCI format having a first size is used for releasing PUSCH transmission, transmitting a second PDCCH candidate with the CCE AL in a second set of CCEs in the CORESET for a second DCI format associated with a second serving cell wherein the second set of CCEs is given at least based on the CIF value of the second serving cell and the second DCI format has a second size, receiving, from the UE, a capability to indicate support of search space sharing for operation of carrier aggregation operation, transmitting the second PDCCH candidate in the first set of CCEs in a case that the first size and the second size are same.

A user equipment (UE) is described. The UE includes reception circuitry configured to receive, reception circuitry configured to receive, from a base station, information to configure a plurality of carriers for cross-carrier scheduling and to configure carrier indicator field (CIF) value for respective carrier, monitor a first set of PDCCH candidates with a CCE aggregation level (AL) in a first set of CCEs in a CORESET for a first DCI format associated with a first serving cell wherein the first set of CCEs is given at least based on the CIF value of the first serving cell and the first DCI format having a first size is used for releasing PUSCH transmission, monitor a second set of PDCCH candidates with the CCE AL in a second set of CCEs in the CORESET for a second DCI format associated with a second serving cell wherein the second set of CCEs is given at least based on the CIF value of the second serving cell and the second DCI format has a second size, transmission circuitry configured to transmit, to the base station, a capability to indicate support of search space sharing for operation of carrier aggregation so that the UE can receive a PDCCH through a PDCCH candidate for the second DCI format in the first set of CCEs in a case that the first size and the second size are same.

A base station is described. The base station includes transmission circuitry configured to transmit, to a user equipment (UE), transmission circuitry configured to transmit, to a user equipment (UE), information to configure a plurality of carriers for cross-carrier scheduling and to configure carrier indicator field (CIF) value for respective carrier, transmit a first PDCCH candidate with a CCE aggregation level (AL) in a first set of CCEs in a CORESET for a first DCI format associated with a first serving cell wherein the first set of CCEs is given at least based on the CIF value of the first serving cell and the first DCI format having a first size is used for releasing PUSCH transmission, transmit a second PDCCH candidate with the CCE AL in a second set of CCEs in the CORESET for a second DCI format associated with a second serving cell wherein the second set of CCEs is given at least based on the CIF value of the second serving cell and the second DCI format has a second size, reception circuitry configured to receive, from the UE, a capability to indicate support of search space sharing for operation of carrier aggregation operation, transmission circuitry configured to transmit the second PDCCH candidate in the first set of CCEs in a case that the first size and the second size are same.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN). 3GPP NR (New Radio) is the name given to a project to improve the LTE mobile phone or device standard to cope with future requirements. In one aspect, LTE has been modified to provide support and specification (TS 38.331, 38.321, 38.300, 37.300, 38.211, 38.212, 38.213, 38.214, etc) for the New Radio Access (NR) and Next generation—Radio Access Network (NG-RAN).

At least some aspects of the systems and methods disclosed herein may be described in relation to the 3GPP LTE, LTE-Advanced (LTE-A), LTE-Advanced Pro, New Radio Access (NR), and other 3G/4G/5G standards (e.g., 3GPP Releases 8, 9, 10, 11, 12, 13, 14, and/or 15, and/or Narrow Band-Internet of Things (NB-IoT)). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE (User Equipment), an access terminal, a subscriber station, a mobile terminal, a remote station, a user terminal, a terminal, a subscriber unit, a mobile device, a relay node, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a gNB, a Node B, an eNB, a home enhanced or evolved Node B (HeNB) or some other similar terminology. As the scope of the disclosure should not be limited to 3GPP standards, the terms "base station,", "gNB", "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced), IMT-2020 (5G) and all of it or a subset of it may be adopted by 3GPP as licensed bands (e.g., frequency bands) to be used for communication between a base station and a UE. It should also be noted that in NR, NG-RAN, E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by a base station to transmit or receive information. "Configured cell(s)" may be serving cell(s). The UE may receive system information and perform the required measurements on configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The base stations may be connected by the NG interface to the 5G—core network (5G-CN). 5G-CN may be called as to NextGen core (NGC), or 5G core (5GC). The base stations may also be connected by the S1 interface to the evolved packet core (EPC). For instance, the base stations may be connected to a NextGen (NG) mobility management function by the NG-2 interface and to the NG core User Plane (UP) functions by the NG-3 interface. The NG interface supports a many-to-many relation between NG mobility management functions, NG core UP functions and the base stations. The NG-2 interface is the NG interface for the control plane and the NG-3 interface is the NG interface for the user plane. For instance, for EPC connection, the base stations may be connected to a mobility management entity (MME) by the S1-MME interface and to the serving gateway (S-GW) by the S1-U interface. The S1 interface supports a many-to-many relation between MMEs, serving gateways and the base stations. The S1-MME interface is the S1 interface for the control plane and the S1-U interface is the S1 interface for the user plane. The Uu interface is a radio interface between the UE and the base station for the radio protocol.

The radio protocol architecture may include the user plane and the control plane. The user plane protocol stack may include packet data convergence protocol (PDCP), radio link control (RLC), medium access control (MAC) and physical (PHY) layers. A DRB (Data Radio Bearer) is a radio bearer that carries user data (as opposed to control plane signaling). For example, a DRB may be mapped to the user plane protocol stack. The PDCP, RLC, MAC and PHY sublayers (terminated at the base station 460a on the network) may perform functions (e.g., header compression, ciphering, scheduling, ARQ and HARQ) for the user plane. PDCP entities are located in the PDCP sublayer. RLC entities may be located in the RLC sublayer. MAC entities may be located in the MAC sublayer. The PHY entities may be located in the PHY sublayer.

The control plane may include a control plane protocol stack. The PDCP sublayer (terminated in base station on the network side) may perform functions (e.g., ciphering and integrity protection) for the control plane. The RLC and MAC sublayers (terminated in base station on the network side) may perform the same functions as for the user plane. The Radio Resource Control (RRC) (terminated in base station on the network side) may perform the following functions. The RRC may perform broadcast functions, paging, RRC connection management, radio bearer (RB) control, mobility functions, UE measurement reporting and control. The Non-Access Stratum (NAS) control protocol (terminated in MME on the network side) may perform, among other things, evolved packet system (EPS) bearer management, authentication, evolved packet system connection management (ECM)-IDLE mobility handling, paging origination in ECM-IDLE and security control.

Signaling Radio Bearers (SRBs) are Radio Bearers (RB) that may be used only for the transmission of RRC and NAS messages. Three SRBs may be defined. SRB0 may be used for RRC messages using the common control channel (CCCH) logical channel. SRB1 may be used for RRC messages (which may include a piggybacked NAS message) as well as for NAS messages prior to the establishment of SRB2, all using the dedicated control channel (DCCH) logical channel. SRB2 may be used for RRC messages which include logged measurement information as well as for NAS messages, all using the DCCH logical channel. SRB2 has a lower-priority than SRB1 and may be configured by a network (e.g., base station) after security activation. A broadcast control channel (BCCH) logical channel may be used for broadcasting system information. Some of BCCH logical channel may convey system information which may be sent from the network to the UE via BCH (Broadcast Channel) transport channel. BCH may be sent on a physical broadcast channel (PBCH). Some of BCCH logical channel may convey system information which may be sent from the network to the UE via DL-SCH (Downlink Shared Channel) transport channel. Paging may be provided by using paging control channel (PCCH) logical channel.

For example, the DL-DCCH logical channel may be used (but not limited to) for a RRC reconfiguration message, a RRC reestablishment message, a RRC release, a UE Capability Enquiry message, a DL Information Transfer message or a Security Mode Command message. UL-DCCH logical channel may be used (but not limited to) for a measurement report message, a RRC Reconfiguration Complete message, a RRC Reestablishment Complete message, a RRC Setup Complete message, a Security Mode Complete message, a Security Mode Failure message, a UE Capability Information, message, a UL Handover Preparation Transfer message, a UL Information Transfer message, a Counter Check Response message, a UE Information Response message, a Proximity Indication message, a RN (Relay Node) Reconfiguration Complete message, an MBMS Counting Response message, an inter Frequency RSTD Measurement Indication message, a UE Assistance Information message, an In-device Coexistence Indication message, an MBMS Interest Indication message, an SCG Failure Information message. DL-CCCH logical channel may be used (but not limited to) for a RRC Connection Reestablishment message, a RRC Reestablishment Reject message, a RRC Reject message, or a RRC Setup message. UL-CCCH logical channel may be used (but not limited to) for a RRC Reestablishment Request message, or a RRC Setup Request message.

System information may be divided into the MasterinformationBlock (MIB) and a number of SystemInformationBlocks (SIBS).

The UE may receive one or more RRC messages from the base station to obtain RRC configurations or parameters. The RRC layer of the UE may configure RRC layer and/or lower layers (e.g., PHY layer, MAC layer, RLC layer, PDCP layer) of the UE according to the RRC configurations or parameters which may be configured by the RRC messages, broadcasted system information, and so on. The base station may transmit one or more RRC messages to the UE to cause the UE to configure RRC layer and/or lower layers of the UE according to the RRC configurations or parameters which may be configured by the RRC messages, broadcasted system information, and so on.

When carrier aggregation is configured, the UE may have one RRC connection with the network. One radio interface may provide carrier aggregation. During RRC establishment, re-establishment and handover, one serving cell may provide Non-Access Stratum (NAS) mobility information (e.g., a tracking area identity (TAI)). During RRC re-establishment and handover, one serving cell may provide a security input. This cell may be referred to as the primary cell (PCell). In the downlink, the component carrier corresponding to the PCell may be the downlink primary component carrier (DL PCC), while in the uplink it may be the uplink primary component carrier (UL PCC).

Depending on UE capabilities, one or more SCells may be configured to form together with the PCell a set of serving cells. In the downlink, the component carrier corresponding to an SCell may be a downlink secondary component carrier (DL SCC), while in the uplink it may be an uplink secondary component carrier (UL SCC).

The configured set of serving cells for the UE, therefore, may consist of one PCell and one or more SCells. For each SCell, the usage of uplink resources by the UE (in addition to the downlink resources) may be configurable. The number of DL SCCs configured may be larger than or equal to the number of UL SCCs and no SCell may be configured for usage of uplink resources only.

From a UE viewpoint, each uplink resource may belong to one serving cell. The number of serving cells that may be configured depends on the aggregation capability of the UE. The PCell may only be changed using a handover procedure (e.g., with a security key change and a random access procedure). A PCell may be used for transmission of the PUCCH. A primary secondary cell (PSCell) may also be used for transmission of the PUCCH. The PSCell may be referred to as a primary SCG cell or SpCell of a secondary cell group. The PCell or PSCell may not be de-activated. Re-establishment may be triggered when the PCell experiences radio link failure (RLF), not when the SCells experience RLF. Furthermore, NAS information may be taken from the PCell.

The reconfiguration, addition and removal of SCells may be performed by RRC. At handover or reconfiguration with sync, Radio Resource Control (RRC) layer may also add, remove or reconfigure SCells for usage with a target PCell. When adding a new SCell, dedicated RRC signaling may be used for sending all required system information of the SCell (e.g., while in connected mode, UEs need not acquire broadcasted system information directly from the SCells).

The systems and methods described herein may enhance the efficient use of radio resources in Carrier aggregation (CA) operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single base station is assumed to provide multiple serving cells for a UE. Even in scenarios where two or more cells may be aggregated (e.g., a macro cell aggregated with remote radio head (RRH) cells) the cells may be controlled (e.g., scheduled) by a single base station.

The systems and methods described herein may enhance the efficient use of radio resources in Carrier aggregation operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single base station is assumed to provide multiple serving cells for a UE. Even in scenarios where two or more cells may be aggregated (e.g., a macro cell aggregated with remote radio head (RRH) cells) the cells may be controlled (e.g., scheduled) by a single base station. However, in a small cell deployment scenario, each node (e.g., base station, RRH, etc.) may have its own independent scheduler. To maximize the efficiency of radio resources utilization of both nodes, a UE may connect to two or more nodes that have different schedulers. The systems and methods described herein may enhance the efficient use of radio resources in dual connectivity operation. A UE may be configured multiple groups of serving cells, where each group may have carrier aggregation operation (e.g., if the group includes more than one serving cell).

In Dual Connectivity (DC) the UE may be required to be capable of UL-CA with simultaneous PUCCH/PUCCH and PUCCH/PUSCH transmissions across cell-groups (CGs). In a small cell deployment scenario, each node (e.g., eNB, RRH, etc.) may have its own independent scheduler. To maximize the efficiency of radio resources utilization of both nodes, a UE may connect to two or more nodes that have different schedulers. A UE may be configured multiple groups of serving cells, where each group may have carrier aggregation operation (e.g., if the group includes more than one serving cell). A UE in RRC CONNECTED may be configured with Dual Connectivity or MR-DC, when configured with a Master and a Secondary Cell Group. A Cell Group (CG) may be a subset of the serving cells of a UE, configured with Dual Connectivity (DC) or MR-DC, i.e. a Master Cell Group (MCG) or a Secondary Cell Group (SCG). The Master Cell Group may be a group of serving cells of a UE comprising of the PCell and zero or more secondary cells. The Secondary Cell Group (SCG) may be a group of secondary cells of a UE, configured with DC or MR-DC, comprising of the PSCell and zero or more other secondary cells. A Primary Secondary Cell (PSCell) may be the SCG cell in which the UE is instructed to perform random access when performing the SCG change procedure. "PSCell" may be also called as a Primary SCG Cell. In Dual Connectivity or MR-DC, two MAC entities may be configured in the UE: one for the MCG and one for the SCG. Each MAC entity may be configured by RRC with a serving cell supporting PUCCH transmission and contention based Random Access. In a MAC layer, the term Special Cell (SpCell) may refer to such cell, whereas the term SCell may refer to other serving cells. The term SpCell either may refer to the PCell of the MCG or the PSCell of the SCG depending on if the MAC entity is associated to the MCG or the SCG, respectively. A Timing Advance Group (TAG) containing the SpCell of a MAC entity may be referred to as primary TAG (pTAG), whereas the term secondary TAG (sTAG) refers to other TAGs.

DC may be further enhanced to support Multi-RAT Dual Connectivity (MR-DC). MR-DC may be a generalization of the Intra-E-UTRA Dual Connectivity (DC) described in 36.300, where a multiple Rx/Tx UE may be configured to utilize resources provided by two different nodes connected via non-ideal backhaul, one providing E-UTRA access and the other one providing NR access. One node acts as a Mater Node (MN) and the other as a Secondary Node (SN). The MN and SN are connected via a network interface and at least the MN is connected to the core network. In DC, a PSCell may be a primary secondary cell. In EN-DC, a PSCell may be a primary SCG cell or SpCell of a secondary cell group.

E-UTRAN may support MR-DC via E-UTRA-NR Dual Connectivity (EN-DC), in which a UE is connected to one eNB that acts as a MN and one en-gNB that acts as a SN. The en-gNB is a node providing NR user plane and control plane protocol terminations towards the UE, and acting as Secondary Node in EN-DC. The eNB is connected to the EPC via the S1 interface and to the en-gNB via the X2 interface. The en-gNB might also be connected to the EPC via the S1-U interface and other en-gNBs via the X2-U interface.

A timer is running once it is started, until it is stopped or until it expires; otherwise it is not running. A timer can be started if it is not running or restarted if it is running. A Timer may be always started or restarted from its initial value.

For NR, a technology of aggregating NR carriers may be studied. Both lower layer aggregation like Carrier Aggregation (CA) for LTE and upper layer aggregation like DC are investigated. From layer 2/3 point of view, aggregation of carriers with different numerologies may be supported in NR.

The main services and functions of the RRC sublayer may include the following:
Broadcast of System Information related to Access Stratum (AS) and Non Access Stratum (NAS);
Paging initiated by CN or RAN;
Establishment, maintenance and release of an RRC connection between the UE and NR RAN including:
Addition, modification and release of carrier aggregation;
Addition, modification and release of Dual Connectivity in NR or between LTE and NR;
Security functions including key management;
Establishment, configuration, maintenance and release of signaling radio bearers and data radio bearers;
Mobility functions including:
Handover;
UE cell selection and reselection and control of cell selection and reselection;

Context transfer at handover.

QoS management functions;

UE measurement reporting and control of the reporting;

NAS message transfer to/from NAS from/to UE.

Each MAC entity of a UE may be configured by RRC with a Discontinuous Reception (DRX) functionality that controls the UE's PDCCH monitoring activity for the MAC entity's C-RNTI (Radio Network Temporary Identifier), CS-RNTI, INT-RNTI, SFI-RNTI, SP-CSI-RNTI, TPC-PUCCH-RNTI, TPC-PUSCH-RNTI, and TPC-SRS-RNTI. For scheduling at cell level, the following identities are used:

C (Cell)-RNTI: unique UE identification used as an identifier of the RRC Connection and for scheduling (dynamically scheduling, dynamically scheduled unicast transmission);

CS (Configured Scheduling)-RNTI: unique UE identification used for Semi-Persistent Scheduling (configured scheduled unicast transmission);

INT-RNTI: identification of pre-emption in the downlink;

P-RNTI: identification of Paging and System Information change notification in the downlink;

SI-RNTI: identification of Broadcast and System Information in the downlink;

SP-CSI-RNTI: unique UE identification used for semi-persistent CSI reporting on PUSCH;

For power and slot format control, the following identities are used:

SFI-RNTI: identification of slot format;

TPC-PUCCH-RNTI: unique UE identification to control the power of PUCCH;

TPC-PUSCH-RNTI: unique UE identification to control the power of PUSCH;

TPC-SRS-RNTI: unique UE identification to control the power of SRS;

During the random access procedure, the following identities are also used:

RA-RNTI: identification of the Random Access Response in the downlink;

Temporary C-RNTI: UE identification temporarily used for scheduling during the random access procedure;

Random value for contention resolution: UE identification temporarily used for contention resolution purposes during the random access procedure.

For NR connected to 5GC, the following UE identities are used at NG-RAN level:

I-RNTI: used to identify the UE context in RRC_INACTIVE.

The size of various fields in the time domain is expressed in time units $T_c=1/\Delta f_{max} \cdot N_f$ where $\Delta f_{max}=480 \cdot 10^3$ Hz and $N_f=4096$. The constant $k=T_s/T_c=64$ where $T_s=1/(\Delta f_{ref} \cdot N_{f,ref})$, $\Delta f_{ref}=15 \cdot 10^3$ Hz and $N_{f,ref}=2048$.

Multiple OFDM numerologies are supported as given by Table 4.2-1 of [TS 38.211] where μ and the cyclic prefix for a bandwidth part are obtained from the higher-layer parameter subcarrierSpacing and cyclicPrefix, respectively.

The size of various fields in the time domain may be expressed as a number of time units $T_s=1/(15000 \times 2048)$ seconds. Downlink and uplink transmissions are organized into frames with $T_f=(\Delta f_{max} N_f/100) \cdot T_c=10$ ms duration, each consisting of ten subframes of $T_{sf}=(\Delta f_{max} N_f/1000) \cdot T_c=1$ ms duration. The number of consecutive OFDM symbols per subframe is $N_{symb}^{subframe,\mu}=N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9.

For subcarrier spacing (SCS) configuration μ, slots are numbered $n_s^{\mu} \in \{0, \ldots, N_{slot}^{subframe,\mu}-1\}$ in increasing order within a subframe and $$n_{s,f}^{\mu} \in \{0, \ldots, N_{slot}^{frame,\mu}-1\}$$

in increasing order within a frame. $N_{slot}^{subframe,\mu}$ is the number of slots per subframe for subcarrier spacing configuration μ. There are $N_{symb}^{slot}$ consecutive OFDM symbols in a slot where $N_{symb}^{slot}$ depends on the cyclic prefix as given by Tables 4.3.2-1 and 4.3.2-2 of [TS 38.211]. The start of slot in a subframe is aligned in time with the start of OFDM symbol $n_s^{\mu} N_{symb}^{slot}$ in the same subframe. Subcarrier spacing refers to a spacing (or frequency bandwidth) between two consecutive subcarrier in the frequency domain. For example, the subcarrier spacing can be set to 15 kHz, 30 kHz, 60 kHz, 120 kHz, or 240 kHz. A number of consecutive subcarriers (e.g. 12) in the frequency domain defines a resource block. For a carrier with different frequency, the applicable subcarrier may be different. For example, for a carrier in a frequency rang 1, a subcarrier spacing only among a set of {15 kHz, 30 kHz, 60 kHz} is applicable. For a carrier in a frequency rang 2, a subcarrier spacing only among a set of {60 kHz, 120 kHz, 240 kHz} is applicable. The base station may not configure an inapplicable subcarrier spacing for a carrier.

OFDM symbols in a slot can be classified as 'downlink', 'flexible', or 'uplink'. Signaling of slot formats is described in subclause 11.1 of [TS 38.213].

In a slot in a downlink frame, the UE may assume that downlink transmissions only occur in 'downlink' or 'flexible' symbols. In a slot in an uplink frame, the UE may only transmit in 'uplink' or 'flexible' symbols.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more base stations 160 (e.g., eNB, gNB) and one or more user equipments (UEs) 102 in which systems and methods for search space sharing for cross-carrier scheduling may be implemented. The one or more UEs 102 may communicate with one or more base stations 160 using one or more antennas 122a-n. For example, a UE 102 transmits electromagnetic signals to the base station 160 and receives electromagnetic signals from the base station 160 using the one or more antennas 122a-n. The base station 160 communicates with the UE 102 using one or more antennas 180a-n.

It should be noted that in some configurations, one or more of the UEs 102 described herein may be implemented in a single device. For example, multiple UEs 102 may be combined into a single device in some implementations. Additionally or alternatively, in some configurations, one or more of the base stations 160 described herein may be implemented in a single device. For example, multiple base stations 160 may be combined into a single device in some implementations. In the context of FIG. 1, for instance, a single device may include one or more UEs 102 in accordance with the systems and methods described herein. Additionally or alternatively, one or more base stations 160 in accordance with the systems and methods described herein may be implemented as a single device or multiple devices.

The UE 102 and the base station 160 may use one or more channels 119, 121 to communicate with each other. For example, a UE 102 may transmit information or data to the base station 160 using one or more uplink (UL) channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more base stations 160 may also transmit information or data to the one or more UEs 102 using one or more downlink (DL) channels 119 and signals, for instance. Examples of downlink channels 119 include a PDCCH, a PDSCH, etc. A PDCCH can be used to schedule DL transmissions on PDSCH and UL transmissions on PUSCH, where the Downlink Control Information (DCI, DCI format) on PDCCH includes the downlink assignment (DL assignment) and the uplink scheduling grant (UL grant). The PDCCH is used for transmitting Downlink Control Information (DCI) in a case of downlink radio communication (radio communication from the base station to the UE). Here, one or more DCIS (may be referred to as DCI formats) are defined for transmission of downlink control information. Information bits are mapped to one or more fields defined in a DCI format. Examples of downlink signals include a primary synchronization signal (PSS), a secondary synchronization signal (SSS), a cell-specific reference signal (CRS), a non-zero power channel state information reference signal (NZP CSI-RS), and a zero power channel state information reference signal (ZP CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals (e.g., downlink channels, downlink signals) from the base station 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals (e.g., uplink channels, uplink signals) to the base station 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more base stations 160. The UE operations module 124 may include a UE RRC information configuration module 126. The UE operations module 124 may include a UE DCI control module 128. In some implementations, the UE operations module 124 may include physical (PHY) entities, Medium Access Control (MAC) entities, Radio Link Control (RLC) entities, packet data convergence protocol (PDCP) entities, and an Radio Resource Control (RRC) entity. The UE RRC information configuration module 126 may process information (e.g. RRC parameters for a plurality of carrier configurations, CIF value for each carrier, search space configurations and CORESET configuration) received from the base station. For example, the UE RRC information configuration module 126 may process RRC parameter for search space configurations. The UE DCI control module (processing module) 128 may determine when and where to monitor or search the configured PDCCH candidates for each search space set in a CORESET based on the processing output from the UE RRC information configuration module 126. For a UE capable of support of search space sharing, the UE DCI control module 126 may, if the first DCI format associated with a first serving cell and the second DCI format associated with a second serving cell have a same DCI size, determine to receive a PDCCH through a PDCCH candidate for the second DCI format in a first set of CCEs where are allocated for PDCCH candidates for the first DCI format.

The UE operations module 124 may provide information 148 to the one or more receivers 120. For example, the UE operations module 124 may inform the receiver(s) 120 when or when not to receive transmissions based on the Radio Resource Control (RRC) message (e.g., broadcasted system information, RRC reconfiguration message), MAC control element, and/or the DCI (Downlink Control Information). The UE operations module 124 may provide information 148, including the PDCCH monitoring occasions and DCI format size, to the one or more receivers 120. The UE operation module 124 may inform the receiver(s) 120 when or where to receive/monitor the PDCCH candidate for DCI formats with which DCI size.

The UE operations module 124 may provide information 138 to the demodulator 114. For example, the UE operations module 124 may inform the demodulator 114 of a modulation pattern anticipated for transmissions from the base station 160.

The UE operations module 124 may provide information 136 to the decoder 108. For example, the UE operations module 124 may inform the decoder 108 of an anticipated encoding for transmissions from the base station 160. For example, the UE operations module 124 may inform the decoder 108 of an anticipated PDCCH candidate encoding with which DCI size for transmissions from the base station 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the base station 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the base station 160. The one or more transmitters 158 may upconvert and transmit the modulated signal(s) 156 to one or more base stations 160.

The base station 160 may include one or more transceivers 176, one or more demodulators 172, one or more decoders 166, one or more encoders 109, one or more modulators 113, one or more data buffers 162 and one or more base station operations modules 182. For example, one or more reception and/or transmission paths may be implemented in a base station 160. For convenience, only a single transceiver 176, decoder 166, demodulator 172, encoder 109 and modulator 113 are illustrated in the base station 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals (e.g., uplink channels, uplink signals) from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals (e.g., downlink channels, downlink signals) to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The base station 160 may use the decoder 166 to decode signals. The decoder 166 may produce one or more decoded signals 164, 168. For example, a first base station-decoded signal 164 may comprise received payload data, which may be stored in a data buffer 162. A second base station-decoded signal 168 may comprise overhead data and/or control data. For example, the second base station-decoded signal 168 may provide data (e.g., PUSCH transmission data) that may be used by the base station operations module 182 to perform one or more operations.

In general, the base station operations module 182 may enable the base station 160 to communicate with the one or more UEs 102. The base station operations module 182 may include a base station RRC information configuration module 194. The base station operations module 182 may include a base station DCI control module 196. The base station operations module 182 may include PHY entities, MAC entities, RLC entities, PDCP entities, and an RRC entity. For example, the base station operation module 196 may determine, for UE(s), when and where to monitor or search the configured PDCCH candidates for each search space set for each serving cell.

The base station DCI control module 196 may determine, for respective UE, when and where to monitor or search a configured PDCCH candidate for a search space set in a CORSET. The base station RRC information configuration module 194 may generate information (e.g. RRC parameters for a plurality of carrier configurations, CIF value for each carrier, search space configurations and CORESET configuration) based on the output from the base station DCI control module 196. The base station DCI control module 196 may, for a UE capable of support of search space sharing, if the first DCI format associated with a first serving cell and the second DCI format associated with a second serving cell have a same DCI size, determine to transmit a PDCCH through a PDCCH candidate for the second DCI format in a first set of CCEs where are allocated for PDCCH candidates for the first DCI format.

The base station operations module 182 may provide the benefit of performing PDCCH candidate search and monitoring efficiently.

The base station operations module 182 may provide information 190 to the one or more receivers 178. For example, the base station operations module 182 may inform the receiver(s) 178 when or when not to receive transmissions based on the RRC message (e.g., broadcasted system information, RRC reconfiguration message), MAC control element, and/or the DCI (Downlink Control Information).

The base station operations module 182 may provide information 188 to the demodulator 172. For example, the base station operations module 182 may inform the demodulator 172 of a modulation pattern anticipated for transmissions from the UE(s) 102.

The base station operations module 182 may provide information 186 to the decoder 166. For example, the base station operations module 182 may inform the decoder 166 of an anticipated encoding for transmissions from the UE(s) 102.

The base station operations module 182 may provide information 101 to the encoder 109. The information 101 may include data to be encoded and/or instructions for encoding. For example, the base station operations module 182 may instruct the encoder 109 to encode transmission data 105 and/or other information 101.

In general, the base station operations module 182 may enable the base station 160 to communicate with one or more network nodes (e.g., a NG mobility management function, a NG core UP functions, a mobility management entity (MME), serving gateway (S-GW), gNBs). The base station operations module 182 may also generate a RRC reconfiguration message to be signaled to the UE 102.

The encoder 109 may encode transmission data 105 and/or other information 101 provided by the base station operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The base station operations module 182 may provide information 103 to the modulator 113. This information 103 may include instructions for the modulator 113. For example, the base station operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The base station operations module 182 may provide information 192 to the one or more transmitters 117. This information 192 may include instructions for the one or more transmitters 117. For example, the base station operations module 182 may instruct the one or more transmitters 117 when to (or when not to) transmit a signal to the UE(s) 102. The base station operations module 182 may provide information 192, including the PDCCH monitoring occasions and DCI format size, to the one or more transmitters 117. The base station operation module 182 may inform the transmitter(s) 117 when or where to transmit the PDCCH candidate for DCI formats with which DCI size. The one or more transmitters 117 may upconvert and transmit the modulated signal(s) 115 to one or more UEs 102.

It should be noted that one or more of the elements or parts thereof included in the base station(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

A base station may generate a RRC message including the one or more RRC parameters, and transmit the RRC message to a UE. A UE may receive, from a base station, a RRC message including one or more RRC parameters. The term 'RRC parameter(s)' in the present disclosure may be alternatively referred to as 'RRC information element(s)'. A RRC parameter may further include one or more RRC parameter(s). In the present disclosure, a RRC message may include system information. a RRC message may include one or more RRC parameters. A RRC message may be sent on a broadcast control channel (BCCH) logical channel, a common control channel (CCCH) logical channel or a dedicated control channel (DCCH) logical channel.

In the present disclosure, a description 'a base station may configure a UE to' may also imply/refer to 'a base station may transmit, to a UE, an RRC message including one or more RRC parameters'. Additionally or alternatively, 'RRC parameter configure a UE to' may also refer to 'a base station may transmit, to a UE, an RRC message including one or more RRC parameters'. Additionally or alternatively, 'a UE is configured to' may also refer to 'a UE may receive, from a base station, an RRC message including one or more RRC parameters'.

A base station may transmit a RRC message including one or more RRC parameters related to BWP configuration to a UE. A UE may receive the RRC message including one or more RRC parameters related to BWP configuration from a base station. For each cell, the base station may configure at least an initial DL BWP and one initial uplink bandwidth parts (initial UL BWP) to the UE. Furthermore, the base station may configure additional UL and DL BWPs to the UE for a cell.

A RRC parameters initialDownlinkBWP may indicate the initial downlink BWP (initial DL BWP) configuration for a serving cell (e.g., a SpCell and Scell). The base station may configure the RRC parameter locationAndBandwidth included in the initialDownlinkBWP so that the initial DL BWP contains the entire CORESET 0 of this serving cell in the frequency domain. The locationAndBandwidth may be used to indicate the frequency domain location and bandwidth of a BWP. A RRC parameters initialUplinkBWP may indicate the initial uplink BWP (initial UL BWP) configuration for a serving cell (e.g., a SpCell and Scell). The base station may transmit initialDownlinkBWP and/or initialUplinkBWP which may be included in SIB1, RRC parameter ServingCellConfigCommon, or RRC parameter ServingCellConfig to the UE.

SIB1, which is a cell-specific system information block (SystemInformationBlock, SIB), may contain information relevant when evaluating if a UE is allowed to access a cell and define the scheduling of other system information. SIB1 may also contain radio resource configuration information that is common for all UEs and barring information applied to the unified access control. The RRC parameter ServingCellConfigCommon is used to configure cell specific parameters of a UE's serving cell. The RRC parameter ServingCellConfig is used to configure (add or modify) the UE with a serving cell, which may be the SpCell or an SCell of an MCS or SCG. The RRC parameter ServingCellConfig herein are mostly UE specific but partly also cell specific.

The base station may configure the UE with a RRC parameter BWP-Downlink and a RRC parameter BWP-Uplink. The RRC parameter BWP-Downlink can be used to configure an additional DL BWP. The RRC parameter BWP-Uplink can be used to configure an additional UL BWP. The base station may transmit the BWP-Downlink and the BWP-Uplink which may be included in RRC parameter ServingCellConfig to the UE.

If a UE is not configured (provided) initialDownlinkBWP from a base station, an initial DL BWP is defined by a location and number of contiguous physical resource blocks (PRBs), starting from a PRB with the lowest index and ending at a PRB with the highest index among PRBs of a CORESET for Type0-PDCCH. CSS set (i.e., CORESET 0), and a subcarrier spacing (SCS) and a cyclic prefix for PDCCH reception in the CORESET for Type0-PDCCH CSS set. If a UE is configured (provided) initialDownlinkBWP from a base station, the initial DL BWP is provided by initialDownlinkBWP. If a UE is configured (provided) initialUplinkBWP from a base station, the initial UL BWP is provided by initialUplinkBWP.

The UE may be configured by the based station, at least one initial BWP and up to 4 additional BWP(s). One of the initial BWP and the configured additional BWP(s) may be activated as an active BWP. The UE may monitor DCI format, and/or receive PDSCH in the active DL BWP. The UE may not monitor DCI format, and/or receive PDSCH in a DL BWP other than the active DL BWP. The UE may transmit PUSCH and/or PUCCH in the active UL BWP. The UE may not transmit PUSCH and/or PUCCH in a BWP other than the active UL BWP.

As above-mentioned, a UE may monitor DCI format in the active DL BWP. To be more specific, a UE may monitor a set of PDCCH candidates in one or more CORESETs on the active DL BWP on each activated serving cell configured with PDCCH monitoring according to corresponding search space set where monitoring implies decoding each PDCCH candidate according to the monitored DCI formats.

A set of PDCCH candidates for a UE to monitor is defined in terms of PDCCH search space sets. A search space set can be a CSS set or a USS set. A UE may monitor a set of PDCCH candidates in one or more of the following search space sets a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG a Type0A-PDCCH CSS set configured by searchSpaceOtherSystemInformation in PDCCH-ConfigCommon for a DCI format with CRC scrambled by a SI-RNTI on the primary cell of the MCG a Type1-PDCCH CSS set configured by ra-SearchSpace in PDCCH-ConfigCommon for a DCI format with CRC scrambled by a RA-RNTI or a TC-RNTI on the primary cell a Type2-PDCCH CSS set configured by paging-SearchSpace in PDCCH-ConfigCommon for a DCI format with CRC scrambled by a P-RNTI on the primary cell of the MCG a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, or CS-RNTI(s).

For a DL BWP, if a UE is configured (provided) one above-described search space set, the UE may determine PDCCH monitoring occasions for a set of PDCCH candidates of the configured search space set. PDCCH monitoring occasions for monitoring PDCCH candidates of a search space set s is determined according to the search space set s configuration and a CORESET configuration associated with the search space set s. In other words, a UE may monitor a set of PDCCH candidates of the search space set in the determined (configured) PDCCH monitoring occasions in one or more configured control resource sets (CORESETs) according to the corresponding search space set configurations and CORESET configuration. A base station may transmit, to a UE, information to specify one or more CORESET configuration and/or search space configuration. The information may be included in MIB and/or SIBs broadcasted by the base station. The information may be included in RRC configurations or RRC parameters. A base station may broadcast system information such as MIB, SIBs to indicate CORESET configuration or search space configuration to a UE. Or the base station may transmit a RRC message including one or more RRC parameters related to CORESET configuration and/or search space configuration to a UE.

An illustration of search space set configuration is described below.

A base station may transmit a RRC message including one or more RRC parameters related to search space configuration. A base station may determine one or more RRC parameter(s) related to search space configuration for a UE. A UE may receive, from a base station, a RRC message including one or more RRC parameters related to search space configuration. RRC parameter(s) related to search space configuration (e.g. SearchSpace, searchSpaceZero) defines how and where to search for PDCCH candidates. 'search/monitor for PDCCH candidate for a DCI format' may also refer to 'monitor/search for a DCI format' for short.

For example, a RRC parameter searchSpaceZero is used to configure a common search space 0 of an initial DL BWP. The searchSpaceZero corresponds to 4 bits. The base station may transmit the searchSpaceZero via PBCH(MIB) or ServingCellConfigCommon.

Additionally, a RRC parameter SearchSpace is used to define how/where to search for PDCCH candidates. The RRC parameters search space may include a plurality of RRC parameters as like, searchSpaceId, controlResourceSetId, monitoringSlotPeriodicityAndOffset, duration, monitoringSymbolsWithinSlot; nrofCandidates, searchSpaceType. Some of the above-mentioned RRC parameters may be present or absent in the RRC parameters SearchSpace. Namely, the RRC parameter SearchSpace may include all the above-mentioned RRC parameters. Namely, the RRC parameter SearchSpace may include one or more of the above-mentioned RRC parameters. If some of the parameters are absent in the RRC parameter SearchSpace, the UE 102 may apply a default value for each of those parameters.

Herein, the RRC parameter searchSpaceId is an identity or an index of a search space. The RRC parameter searchSpaceId is used to identify a search space. Or rather, the RRC parameter searchSpaceId provide a search space set index s, $0 \leq s < 40$. Then a search space s hereinafter may refer to a search space identified by index s indicated by RRC parameter searchSpaceId. The RRC parameter controlResourceSetId concerns an identity of a CORESET, used to identify a CORESET. The RRC parameter controlResourceSetId indicates an association between the search space s and the CORESET identified by controlResourceSetId. The RRC parameter controlResourceSetId indicates a CORESET applicable for the search space. CORESET p hereinafter may refer to a CORESET identified by index p indicated by RRC parameter controlResourceSetId. Each search space is associated with one CORESET. The RRC parameter monitoringSlotPeriodicityAndOffset is used to indicate slots for PDCCH monitoring configured as periodicity and offset. Specifically, the RRC parameter monitoringSlotPeriodicityAndOffset indicates a PDCCH monitoring periodicity of $k_s$ slots and a PDCCH monitoring offset of $o_s$ slots. A UE can determine which slot is configured for PDCCH monitoring according to the RRC parameter monitoringSlotPeriodicityAndOffset. The RRC parameter monitoringSymbolsWithinSlot is used to indicate a first symbol(s) for PDCCH monitoring in the slots configured for PDCCH monitoring. That is, the parameter monitoringSymbolsWithinSlot provides a PDCCH monitoring pattern within a slot, indicating first symbol(s) of the CORESET within a slot (configured slot) for PDCCH monitoring. The RRC parameter duration indicates a number of consecutive slots $T_s$ that the search space lasts (or exists) in every occasion (PDCCH occasion, PDCCH monitoring occasion).

The RRC parameter may include aggregationLevel1, aggregationLevel2, aggregationLevel4, aggregationLevel8, aggregationLevel16. The RRC parameter nrofCandidates may provide a number of PDCCH candidates per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, for CCE aggregation level 8, and CCE aggregation level 16, respectively. In other words, the value L can be set to either one in the set {1, 2, 4, 8, 16}. The number of PDCCH candidates per CCE aggregation level L can be configured as 0, 1, 2, 3, 4, 5, 6, or 8. For example, in a case the number of PDCCH candidates per CCE aggregation level L is configured as 0, the UE may not search for PDCCH candidates for CCE aggregation L. That is, in this case, the UE may not monitor PDCCH candidates for CCE aggregation L of a search space set s. For example, the number of PDCCH candidates per CCE aggregation level L is configured as 4, the UE may monitor 4 PDCCH candidates for CCE aggregation level L of a search space set s.

The RRC parameter searchSpaceType is used to indicate that the search space set s is either a CSS set or a USS set. The RRC parameter searchSpaceType may include either a common or a ue-Specific. The RRC parameter common configure the search space set s as a CSS set and DCI format to monitor. The RRC parameter ue-Specific configures the search space set s as a USS set. The RRC parameter ue-Specific may include dci-Formats. The RRC parameter dci-Formats indicates to monitor PDCCH candidates either for DCI format 0_0 and DCI format 1_0, or for DCI format 0_1 and DCI format 1_1, or for DCI format 0_2 and DCI format 1_2, in the search space set s. That is, the RRC parameter searchSpaceType indicates whether the search space set s is a CSS set or a USS set as well as DCI formats to monitor for.

A USS at CCE aggregation level L is defined by a set of PDCCH candidates for CCE aggregation L. A USS set may be constructed by a plurality of USS corresponding to respective CCE aggregation level L. A USS set may include one or more USS(s) corresponding to respective CCE aggregation level L. A CSS at CCE aggregation level L is defined by a set of PDCCH candidates for CCE aggregation L. A CSS set may be constructed by a plurality of USS corresponding to respective CCE aggregation level L. A CSS set may include one or more CSS(s) corresponding to respective CCE aggregation level L.

Herein, 'a UE monitor PDCCH for a search space set s' also refers to 'a UE may monitor a set of PDCCH candidates of the search space set s'. Alternatively, 'a UE monitor PDCCH for a search space set s' also refers to 'a UE may attempt to decode each PDCCH candidate of the search space set s according to the monitored DCI formats'.

In the present disclosure, the term "PDCCH search space sets" may also refer to "PDCCH search space". A UE monitors PDCCH candidates in one or more of search space sets. A search space sets can be a common search space (CSS) set or a UE-specific search space (USS) set. In some implementations, a CSS set may be shared/configured among multiple UEs. The multiple UEs may search PDCCH candidates in the CSS set. In some implementations, a USS set is configured for a specific UE. The UE may search one or more PDCCH candidates in the USS set. In some implementations, a USS set may be at least derived from a value of C-RNTI addressed to a UE.

An illustration of CORESET configuration is described below.

A base station may configure a UE one or more CORESETs for each DL BWP in a serving cell. For example, a RRC parameter ControlResourceSetZero is used to configure CORESET 0 of an initial DL BWP. The RRC parameter ControlResourceSetZero corresponds to 4 bits. The base station may transmit ControlResourceSetZero, which may be included in MIB or RRC parameter ServingCellConfigCommon, to the UE. MIB may include the system information transmitted on BCH(PBCH). A RRC parameter related to initial DL BWP configuration may also include the RRC parameter ControlResourceSetZero. RRC parameter ServingCellConfigCommon is used to configure cell specific parameters of a UE's serving cell and contains parameters which a UE would typically acquire from SSB, MIB or SIBs when accessing the cell form IDLE.

Additionally, a RRC parameter ControlResourceSet is used to configure a time and frequency CORESET other than CORESET 0. The RRC parameter ControlResourceSet may include a plurality of RRC parameters such as, ControlResourceSetId, frequencyDomainResource, duration, cce-REG-MappingType, precoderGranularity, tci-PresentInDCI, pdcch-DMRS-ScramblingID and so on.

Here, the RRC parameter ControlResourceSetId is an CORESET index p, used to identify a CORESET within a serving cell, where 0<p<12. The RRC parameter duration indicates a number of consecutive symbols of the CORESET $N_{symb}^{CORESET}$, which can be configured as 1, 2 or 3 symbols. A CORESET consists of a set of $N_{RB}^{CORESET}$ resource blocks (RBs) in the frequency domain and $N_{symb}^{CORESET}$ symbols in the time domain. The RRC parameter frequencyDomainResource indicates the set of $N_{RB}^{COR-SET}$ RBs for the CORESET. Each bit in the frequencyDomainResource corresponds a group of 6 RBs, with grouping starting from the first RB group in the BWP. The first (left-most/most significant) bit corresponds to the first RB group in the BWP, and so on. A bit that is set to 1 indicates that this RB group belongs to the frequency domain resource of this CORESET.

According to the CORESET configuration, a CORESET (a CORESET 0 or a CORESET p) consists of a set of PRBs with a time duration of 1 to 3 OFDM symbols. The resource units Resource Element Groups (REGs) and Control Channel Elements (CCEs) are defined within a CORESET. A CCE consisting of 6 REGs where a REG equals one resource block during one OFDM symbol. Control channels are formed by aggregation of CCE. That is, a PDCCH consists of one or more CCEs. Different code rates for the control channels are realized by aggregating different number of CCE. Interleaved and non-interleaved CCE-to-REG mapping are supported in a CORESET. Each resource element group carrying PDCCH carries its own DMRS.

Figure 2:
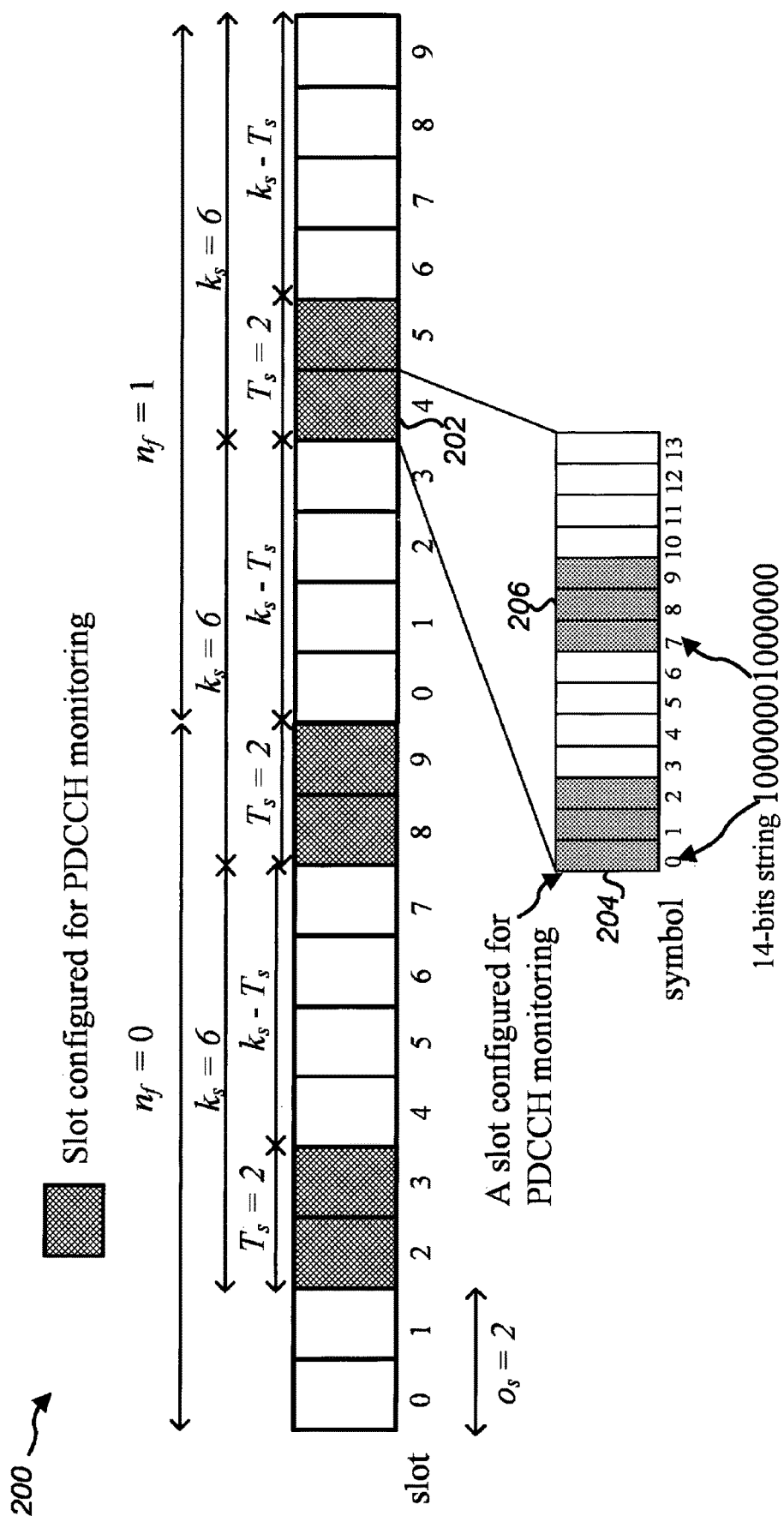
FIG. 2 is a diagram illustrating one example 200 how to determine PDCCH monitoring occasions for PDCCH candidates based on corresponding search space set configuration and CORESET configuration.

In order to monitor a set of PDCCH candidates of a search space set, the UE may determine PDCCH monitoring occasions according to the search space set configuration and associated CORESET configuration. FIG. 2. is a diagram illustrating one example 200 how to determine PDCCH monitoring occasions for PDCCH candidates based on corresponding search space set configuration and CORESET configuration.

In FIG. 2, the PDCCH monitoring periodicity $k_s$ is configured as 6 slots. The PDCCH monitoring offset $o_s$ is configured as 2 slots. The duration $T_s$ is configured as 2 slots. The subcarrier spacing configuration u is configured as 0, which means the subcarrier spacing of the active DL BWP is 15 kHz. In this case u=0, $N^{frame,u}_{slot}$ is equal to 10. That is, in a case u=0, the number of slots per frame is 10. $n^u_{s,f}$ is the slot number within a radio frame. That is, the value of $n^u_{s,f}$ is in a range of $\{0, \ldots, N^{frame,u}_{slot}-1\}$.

The UE 102 may determine a PDCCH monitoring occasion on an active DL BWP from the PDCCH monitoring periodicity, the PDCCH monitoring offset, and the PDCCH monitoring pattern within a slot for each configured search space set s. For a search space set s, the UE 102, if the slot with number $n^u_{s,f}$ satisfies Formula (1) $(n_f * N^{frame,u}_{slot} + n^u_{s,f} - o_s) \mod k_s = 0$, may determine that a PDCCH monitoring occasion(s) exists in a slot with number $n^u_{s,f}$ in a frame with number $n_f$. According to Formula (1), the UE 102 may determine the slots with number $n^u_{s,f}=2$ and $n^u_{s,f}=8$ in a frame with number $n_f=0$ and the slot with number $n^u_{s,f}=4$ in a frame with number $n_f=1$ as the slots in which the PDCCH monitoring occasions exists. Given the $T_s$ is configured as 2 slots, the UE 102 may monitor PDCCH candidates for search space set s for $T_s=2$ consecutive slots, staring from the determined the slots with number $n^u_{s,f}$. In other words, the UE 102 may not monitor PDCCH candidates for search space set s for the next $(k_s-T_s)$ consecutive slots. As depicted in FIG. 2, the UE 102 may determine the slots with number $n^u_{s,f}=2, 3, 8,$ and 9 in a frame with number $n_f=0$ and the slots with number $n^u_{s,f}=4,$ and 5 in a frame with number $n_f=1$ as the slots having PDCCH monitoring occasions. The UE 102 may monitor PDCCH candidates for search space set s in the determined slots configured for PDCCH monitoring. A slot having PDCCH monitoring occasions may also refer to a slot configured for PDCCH monitoring.

Furthermore, a slot determined (or configured) for PDCCH monitoring may have one or more than one PDCCH monitoring occasions. PDCCH monitoring pattern within the slot configured for PDCCH monitoring is indicated by a 14-bits string (monitoringSymbolsWithinSlot). Each bit within the 14-bits string may correspond to a symbol within a slot, respectively. The most significant (left) bit (MSB) may represent the first OFDM in a slot, and the second most significant (left) bit may represent the second OFDM symbol in a slot and so on. The bit(s) set to one may identify the first OFDM symbol(s) of the control resource set within a slot. As depicted in FIG. 2, a slot 202 configured for PDCCH monitoring may have two PDCCH monitoring occasions. The first PDCCH monitoring occasion 204 is located on the first, second and third consecutive symbols. The second PDCCH monitoring occasion 206 is located on the $8^{th}$, $9^{th}$ and $10^{th}$ consecutive OFDM symbols. The duration of one PDCCH monitoring occasion is equal to the duration of a CORESET associated with the search space set s. Generally, the duration of one PDCCH monitoring occasion (the number of the consecutive OFDM symbols for one PDCCH monitoring occasion) can be 1, 2 or 3 symbols. In the FIG. 2, a CORESET comprises one PDCCH monitoring occasion with 3 consecutive ODM symbols in the time domain.

According to the FIG. 2, the UE may monitor a set of PDCCH candidates for the search space set s in the first PDCCH monitoring occasion 204 in the associated CORESET and may further monitor a set of PDCCH candidates for the search space set s in the second PDCCH monitoring occasion 206 in the CORESET in each slot in which the PDCCH monitoring is configured for the search space set s. Here, each PDCCH candidate for the search space set s is mapped in a resource of the associated CORESET in each PDCCH monitoring occasion. In other words, one PDCCH candidate for the search space set s is mapped to one associated CORESET in one PDCCH monitoring occasion. One PDCCH candidate for the search space set s is not mapped to more than one associated CORESET in different PDCCH monitoring occasions. For example, one PDCCH candidate for the search space set s is not mapped to both the first PDCCH monitoring occasion 204 and the second PDCCH monitoring occasion 206.

For the convenience of illustration, the DCI format hereinafter may refer to as 'DCI format for uplink (or, UL grant)' unless the DCI format is specified. DCI format 0_0, DCI format 0_1, or DCI format 0_2 may be used for scheduling PUSCH transmission or releasing PUSCH transmission. The UE 102 may monitor PDCCH candidates for DCI format 0_0 in a CSS or a USS. The UE 102 may monitor PDCCH candidates for DCI format 0_1 and/or DCI format 0_2 in a USS but may not monitor PDCCH candidates for DCI format 01 and/or DCI format 02 in a CSS. The DCI format 0_1 may schedule up to two transport blocks for one PUSCH while the DCI format 0_2 may only schedule one transport blocks for one PUSCH. DCI format 0_2 may not consist of some fields (e.g. 'CBG transmission information' field), which may be present in DCI format 0_1.

In the present disclosure, UE 102 may transmit a PUSCH based on an UL grant and/or higher layer configuration. In other words, PUSCH transmission(s) can be dynamically scheduled by an UL grant in a DCI (or a DCI format, or a PDCCH, or a DCI format in a PDCCH), or can correspond to a configured grant Type 1 or Type 2. To be more specific, a PUSCH transmission dynamically scheduled by an UL grant may refer to as 'a dynamic PUSCH'. A PUSCH corresponding to configured grant Type 1 may refer to as 'a configured grant Type 1 PUSCH (or, for example, an UL grant Type 1 PUSCH, a PUSCH based on a Type 1 configured UL grant, a Type 1 PUSCH with a configured grant, a PUSCH configured by configured grant Type1 configuration)'. A PUSCH corresponding to configured grant Type 2 may refer to as 'a configured grant Type 2 PUSCH (or, for example, an UL grant Type 2 PUSCH, a PUSCH based on a Type 2 configured UL grant, a Type 2 PUSCH with a configured grant, a PUSCH scheduled by activation DCI format)'.

The configured grant Type 1 PUSCH transmission is semi-statically configured to operate upon a reception of a higher layer parameter without the detection of an UL grant in a DCI. The configured grant Type 2 PUSCH transmission is semi-persistently scheduled by an UL grant in a valid activation DCI (or a valid activation DCI format) after the reception of a higher layer parameter.

The UE 102 may validate, for scheduling activation or scheduling release, a DCI format (a configured UL grant Type 2 PDCCH) if the CRC of the corresponding DCI format is scrambled with a CS-RNTI and the new data indicator (NDI) field in the DCI format for the enabled transport block is set to '0'. Validation of the DCI format is achieved if all fields (special fields) for the DCI format are set according to the corresponding case in the FIG. 3. If validation is achieved, the UE 102 may consider the information in the DCI format as a valid activation or valid release of configured UL grant Type 2. If validation is not achieved, the UE discards all the information in the DCI format.

To be more specific, if the UE 102 is provided a single configuration for UL grant Type 2 PUSCH, a DCI format with CRC scrambled by CS-RNTI with NDI=0 may activate the corresponding configured grant Type 2 PUSCH for scheduling activation if the special fields for the DCI format are set according to FIG. 3(*a*). The DCI format herein can refer to as 'activation DCI format'.

If the UE 102 is provided a single configuration for UL grant Type 2 PUSCH, a DCI format with CRC scrambled by CS-RNTI with NDI=0 may release the configured grant Type 2 PUSCH for scheduling release if the special fields for the DCI format are set according to FIG. 3(*b*). The DCI format herein can refer to as 'release DCI format'.

If the UE 102 is provided more than one configuration for UL grant Type 2 PUSCH, a DCI format with CRC scrambled by CS-RNTI with NDI=0 may activate one corresponding configured grant Type 2 PUSCH if the special fields for the DCI format are set according to FIG. 3(c). A value of the HARQ process number field in the DCI format indicates which configuration for UL grant Type 2 PUSCH is activated. The DCI format herein can refer to as 'activation DCI format'.

If the UE 102 is provided more than one configuration for UL grant Type 2 PUSCH, a DCI format with CRC scrambled by CS-RNTI with NDI=0 may release one or more corresponding configured grant Type 2 PUSCH if the special fields for the DCI format are set according to FIG. 3(d). A value of the HARQ process number field in the DCI format indicates which one or more configurations for UL grant Type 2 PUSCH are released. The DCI format herein can refer to as 'release DCI format'.

According to the FIG. 3, DCI format 0_0, DCI format 0_1 or DCI format 0_2 can be used as an activation DCI format or a release DCI format. The UE 102 may determine a received DCI format scrambled by CS-RNTI with NDI=0 as an activation DCI format or a release DCI format based on the values of the one or more special fields of the received DCI format. A release DCI format hereinafter may also refer to as 'uplink grant Type 2 scheduling release (or uplink grant Type 2 scheduling release PDCCH)' or 'uplink grant Type 2 PUSCH release'.

Additionally, DCI format 0_1 and DCI format 0_2 can also be used as an activation DCI format or a release DCI format for semi-persistent CSI report on PUSCH. The UE 102 may determine, for semi-persistent CSI activation or release, a received DCI format scrambled by SP-CSI-RNTI as an activation DCI format or a release DCI format based on the values of the one or more special fields of the received DCI format.

Therefore, a release DCI format hereinafter may include 'uplink grant Type 2 scheduling release (or uplink grant Type 2 scheduling release PDCCH, or uplink grant Type 2 PUSCH release)' and/or 'semi-persistent CSI release (semi-persistent CSI deactivation PDCCH)'. A release DCI format may also refer to as 'A DCI format releasing PUSCH transmission'. A activation DCI format may include 'uplink grant Type 2 scheduling activation' and/or 'semi-persistent CSI activation'.

As above-mentioned, DCI formats relating to PUSCH (or, for example, DCI formats relating to PUSCH transmission, or DCI formats used for the scheduling of PUSCH) may be DCI formats scheduling PUSCH transmission or DCI formats releasing PUSCH transmission. The DCI formats scheduling PUSCH transmission may comprise of (i) dynamic DCI format(s) which dynamically schedule a PUSCH transmission (ii) activation DCI format(s) which semi-persistently schedule (or activate) PUSCH transmission.

Therefore, in terms of the usage of the DCI formats, based on the RNTI type and values of one or more fields in the DCI formats, the UE 102 may determine the DCI formats can be at least used for scheduling the PUSCH transmission or releasing the PUSCH transmission.

Figure 4:
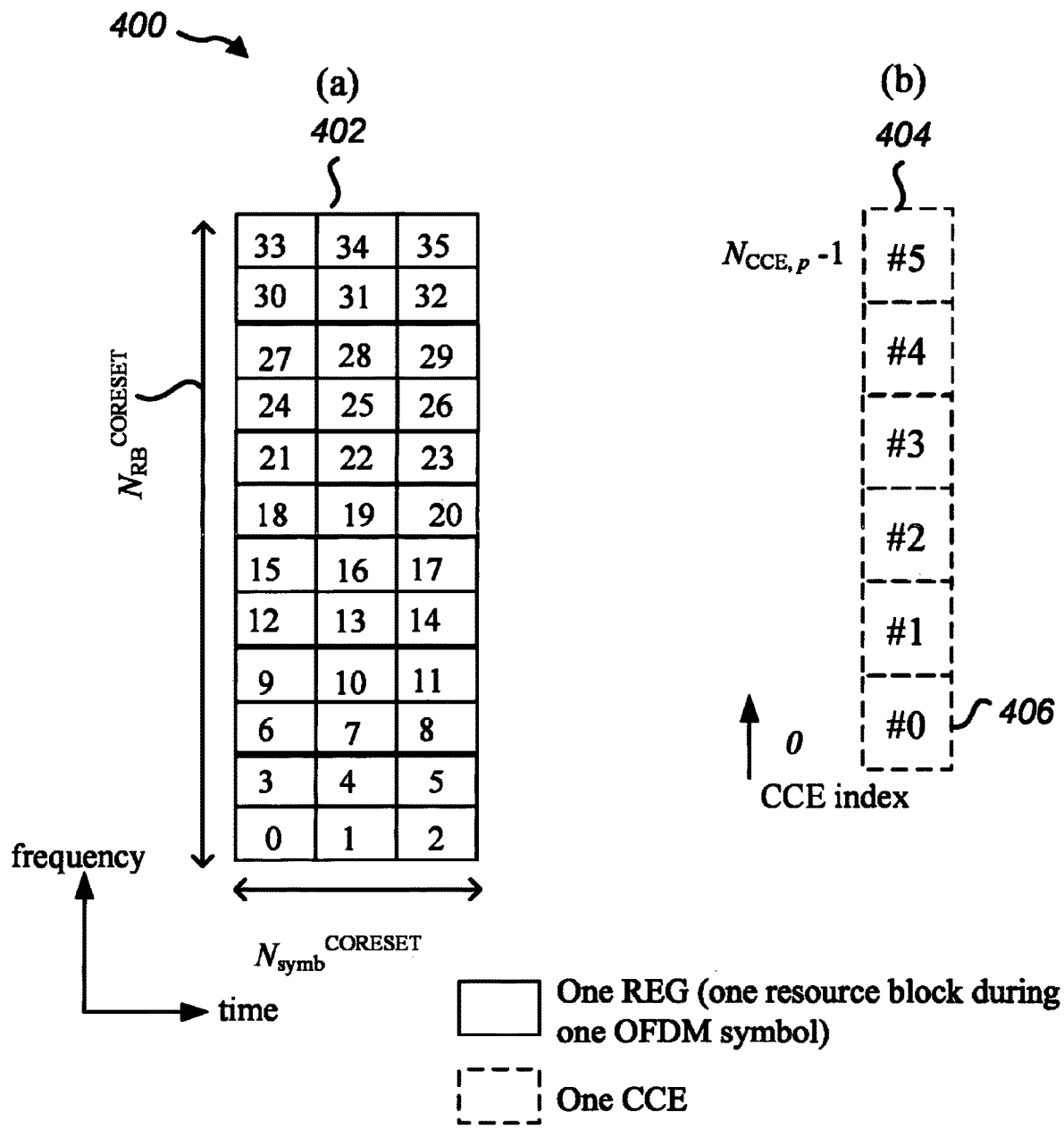
FIG. 4 is a diagram illustrating one example 400 of REG resource numbering for a CORESET.

FIG. 4 is a diagram illustrating one example 400 of REG resource numbering for a CORESET.

The UE 102 may monitor a set of PDCCH candidates for a search space set in a CORESET p which consist of a set of $N_{RB}^{CORESET}$ PRBs and one sets of $N_{symb}^{CORESET}$ consecutive OFDM symbols. The resource blocks $N_{RB}^{CORESET}$ PRBs configured for the CORESET can be contiguous or can be not contiguous in the frequency domain. For the CORESET, the REGs within the CORESET are numbered in increasing order in time-first manner, starting with 0 for the first OFDM symbol and the lowest-numbered resource block in the CORESET. In FIG. 4(a), REGs within the CORESET are numbered in increasing order in time-first manner, starting with 0 for the first OFDM symbol and the lowest-numbered resource block in the 402. The REGs within the CORESET 402 are numbered by 0 to 35 by the time-first manner.

In FIG. 4(b), $N_{CCE,p}$ is the number of CCEs, numbered from 0 to $(N_{CCE,p}-1)$, in the CORESET. The CORESET herein comprises of 6 CCEs. According to the CCE-to-REG mapping, UE 102 may determine a CCE comprising of which corresponding REGs. For non-interleaved CCE-to-REG mapping, all CCEs for a DCI with AL L are mapped in consecutive REG bundles of the CORESET. For example, for non-interleaved CCE-to-REG mapping, a CCE with index 0 (CCE #0) 406 comprises of 6 consecutive REGs with index 0, 1, 2, 3, 4, 5. For interleaved CCE-to-REG mapping, REG bundles constituting the CCEs for a PDCCH are distributed in the frequency domain in units of REG bundles. A REG bundle i is defined as REGs {i*B, i*B+1, ..., i*B+B-1} where B is the REG bundle size indicated by the base station.

The UE 102 can determine the CCE indexes for aggregation level L corresponding to PDCCH candidates of a USS for a USS set based on the value of C-RNTI addressed to the UE. The UE can determine the CCE indexes for aggregation level L corresponding to PDCCH candidates of a CSS for a CSS set without the value of C-RNTI addressed to the UE.

To be more specific, for a search space set s associated with CORESET p, the CCE indexes for aggregation level L corresponding to PDCCH candidate $m_{s,n\_CI}$ of the search space set in slot n for an active DL BWP of a serving cell corresponding to carrier indicator field value, CIF value, n_CI are given by Formula (2) $L*((Y_{p,n}+$ floor$((m_{s,n\_CI}*N_{CCE,p})/(L*M_{s,max}^{(L)}))+n\_CI)$mod (floor$(N_{CCE,p}/L)))+i$. The parameters in the Formula (2) are illustrated as below: for any CSS, $Y_{p,n}$ is equal to 0, while for a USS, $Y_{p,n}=(A_p*Y_{p,n-1})$ mod D where $Y_{p,-1}=n_{RNTI}\neq 0$, $A_p=39827$ for p mod 3=0, $A_p=39829$ for p mod 3=1, $A_p=39839$ for p mod 3=2, and D=65537; slot n can be denoted by $n^u_{s,f}$ representing the slot number within a radio frame with respect to the SCS configuration u; i=0, ..., L-1; $N_{CCE,p}$ is the number of CCEs, numbered from 0 to $(N_{CCE,p}-1)$, in CORESET p; $n_{RNTI}$ is an value of C-RNTI provided by the base station for the UE; n_CI is the carrier indicator field value if the UE 102 is configured with a carrier indicator field for the serving cell on which PDCCH is monitored; otherwise, including for any CSS, the n_CI is equal to 0; $m_{s,n\_CI}=0, ..., M_{s,n\_CI}^{(L)}-1$, where $M_{s,n\_CI}^{(L)}$ is the number of PDCCH candidates the UE is configured to monitor for aggregation level L of the search space set s for a serving cell corresponding to n_CI; for any CSS, $M_{s,max}^{(L)}=M_{s,0}^{(L)}$; for a USS, $M_{s,max}^{(L)}$ is the maximum of $M_{s,n\_CI}^{(L)}$ over all configured n_CI values for a CCE aggregation level L of search space set s.

Here, in a CORESET associated with a search space set s, a set of CCEs for AL L are those determining CCE indexes where the PDCCH candidates, the UE 102 is configured to monitor for AL L of the search space set, are placed. Here, a set of CCEs for AL L can also refer to a USS. That is, a search space set s may comprise of one or more corresponding sets of CCEs for respective AL L. A set of CCEs can also refer to as 'a USS'. A set of CCEs for ALL can also refer to 'a USS at AL L'.

According to the above Formula (2), the UE 102 may identify the corresponding sets of CCEs for ALL for different serving cells at least according to the respective CIF value of the serving cells. That is, the UE 102 may monitor PDCCH candidates associated with different serving cells on different corresponding sets of CCEs.

However, for a UE configured with cross-carrier scheduling, the UE may transmit, to a base station 160, a capability to indicate support of search space sharing for operation of carrier aggregation. That is, the UE can receive one or more PDCCH candidates associated with a serving cell on a set of CCEs which are originally determined for another serving cell for monitoring if the DCI formats associated with these two serving cells have a same size.

For example, a PDCCH candidate associated with the second serving cell can be transmitted by the base station in a CCE location (a set of CCEs) which are originally allocated for the PDCCH candidate associated with the first serving cell if the DCI format associated with the first serving cell have a same size with the DCI format associated with the second serving cell. If the UE received a DCI format associated with the second serving cell in the CCE location allocated for the first second serving cell, the UE may not further to search the PDCCH candidate associated with the second serving cell in another CCE location which are allocated for the second serving cell. From this regard, the UE can save the power consumption. Therefore, the search space sharing is helpful for reducing power consumption and sometimes can avoid PDCCH blocking probability.

However, the existing NR system of Release 16 for uplink only allows the DCI format scheduling PUSCH transmission for search space sharing. In other words, the existing NR system of Release 16 does not allow the release DCI format as mentioned above for search space sharing. The limitation would incur more power consumption to UE given the UE may further search a release DCI format in another CCE location even if the release DCI format has a same size with another DCI format associated with another serving cell. Moreover, the limitation would restrict the base station's flexibility on locating PDCCH candidate and would cause the potential PDCCH blocking probability. Therefore, removing the limitation can provide a flexibility of PDCCH configuration to a base station and help to reduce the power consumption to the UE.

Figure 5:
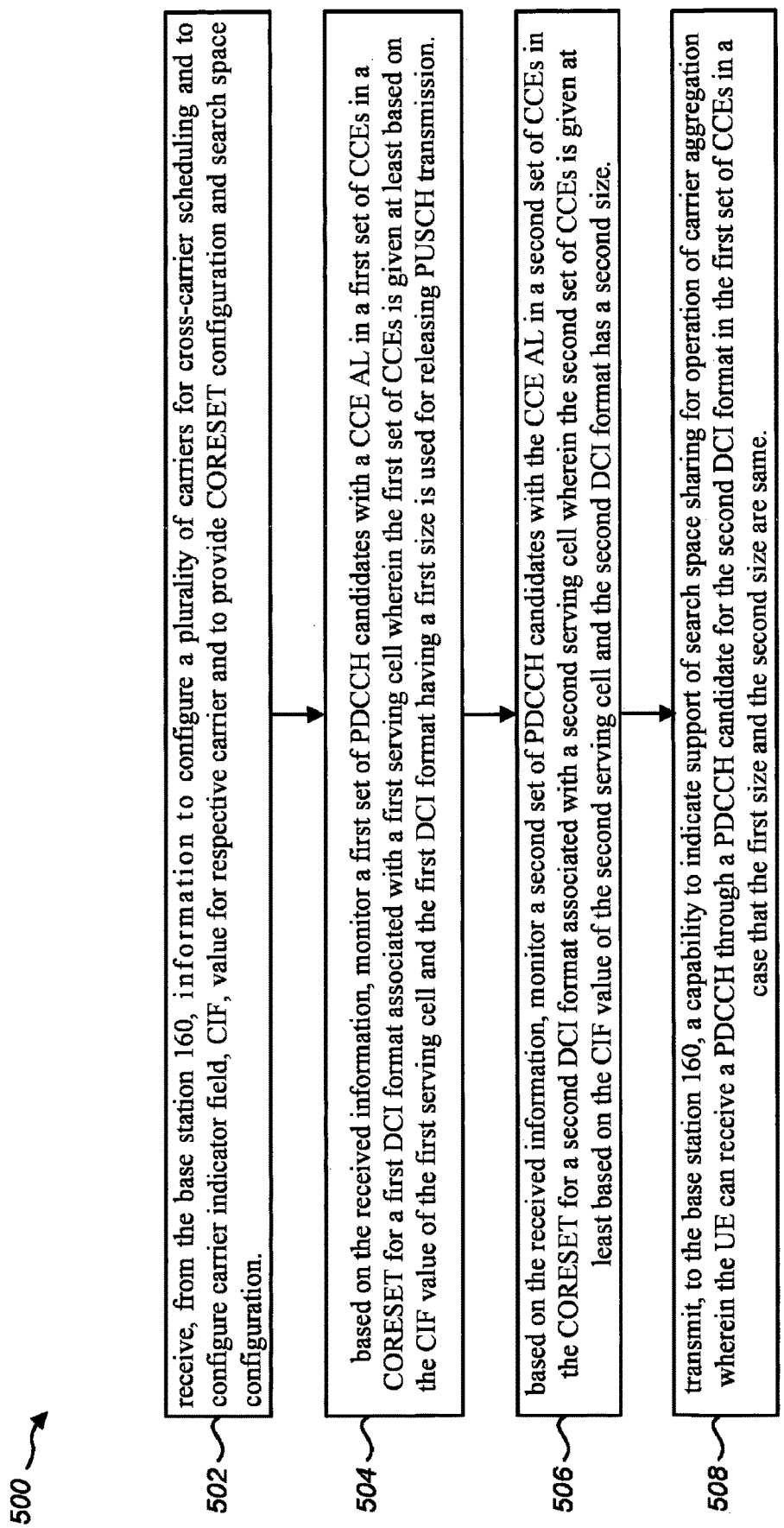
FIG. 5 is a flow diagram illustrating one implementation of a method 500 for search space sharing for cross-carrier scheduling by a UE 102.

FIG. 5 is a flow diagram illustrating one implementation of a method 500 for search space sharing for cross-carrier scheduling by a UE 102.

The UE 102 may receive 502, from a base station 160, information. The information may be included in the MIB (or SIB) which is broadcasted by the base station 160. Additionally or alternatively, the information may be one or more RRC parameters included in a RRC message.

The information received on 502 may configure the UE 102 a plurality of serving cells for operation of carrier aggregation. For example, the information may configure the UE a first serving cell and a second serving cell for carrier aggregation.

The information received on 502 may further configure the UE 102 for cross-carrier scheduling and configure carrier indicator field (CIF) value for respective configured carrier. That is, the information may include a RRC parameter CrossCarrierSchedulingConfig configured for a serving cell to indicate whether the serving cell is cross-carrier scheduled by another serving cell or whether the serving cell cross-carrier schedules another serving cell. The RRC parameter CrossCarrierSchedulingConfig is used to specify the configuration when the cross-carrier scheduling is used in a serving cell. To be more specific, the RRC parameter CrossCarrierSchedulingConfig provides either a RRC parameter A (parameter for self-scheduling) or a RRC parameter B (parameter for cross-carrier scheduling) for a serving cell. If the UE 102 is configured with the RRC parameter A for a serving cell, the serving cell is scheduled by its own PDCCH. If the UE 102 is configured with the RRC parameter B for a serving cell, the serving cell is scheduled by a PDCCH on another serving cell.

In the present disclosure, a serving cell which is cross-carrier scheduled by another serving cell may also refer to 'a scheduled cell'. A serving cell which cross-carrier schedules another serving cell may also refer to 'a scheduling cell'. In other words, a scheduling cell is a serving cell for which the UE 102 is configured with the RRC parameter A while a scheduled cell is a serving cell for which the UE 102 is configured with the RRC parameter B.

The RRC parameter A indicates whether the carrier indicator field is present or not in DCI formats. For cross-carrier scheduling, the RRC parameter A would indicate the carrier indicator is present in DCI formats. The value of the carrier indicator field (CIF value) indicating a DCI format (a UL grant or a DL assignment) for a scheduling cell is 0. Here, 'The UE 102 is configured with RRC parameter A (or RRC parameter CrossCarrierSchedulingConfig) for a serving cell for cross-carrier scheduling' may refer to 'the UE is configured with a carrier indicator field for a serving cell on which PDCCH is monitor'.

If the UE 102 is configured with a carrier indicator field for a serving cell on which PDCCH is monitored, different DCI formats may include the carrier indicator field with different bits. For example, if the UE 102 is configured with a carrier indicator field for a serving cell, the UE may monitor the PDCCH candidates for the DCI format 0_1 including a carrier indicator field with 3 bits on the serving cell while the UE 102 may monitor the PDCCH candidates for the DCI format 0_2 including a carrier field with a configured bits. In other words, the RRC parameter CrossCarrierSchedulingConfig may further provide a RRC parameter C if the RRC parameter A indicates the carrier indicator field is present. The RRC parameter C is used to configure the number of bits for the carrier indicator field in the DCI format 0_2 as 0, 1, 2 or 3 bits. In a case that the number of bits for the carrier indicator field in the DCI format 0_2 is configured (determined) as 0 bit by the RRC parameter C, the UE 102 may not use the DCI format 0_2 monitored in the scheduling cell to cross-carrier schedule the resource as like PUSCH or PUCCH on another scheduled cell. In this case, the UE 102 may use the DCI format 0_1 monitored in the scheduling cell to cross-carrier schedule the resource as like PUSCH or PUCCH on another scheduled cell. According to various implementation of the present disclosure, if the UE 102 is configured with carrier indicator field for a serving cell, the base station 106 may configure the UE 102 to monitor PDCCH on the serving cell via both DCI format 0_1 or DCI format 0_2 including carrier indicator field for cross-carrier scheduling, or the base station 106 may configure the UE 102 to monitor PDCCH on the serving cell via DCI format 0_1 not DCI format 0_2 for cross-carrier scheduling.

For a scheduled cell, the RRC parameter B provides a serving cell ID of the scheduling cell on which the PDCCH (e.g. UL grant or DL assignment) is allowed to be transmitted (monitored) for scheduling resource as like PUSCH, PUCCH and/or PDSCH on the scheduled cell.

The RRC parameter B also provides an CIF value which is used in the scheduling cell to indicate a DCI format (an UL grant or a downlink assignment) applicable for the scheduled cell. If a DCI format (e.g. UL grant or DL assignment) is received in a scheduling cell, UE may determine the received DCI format is applicable for which serving cell according to the CIF value of the received DCI format. In other words, if a CIF value in a DCI format corresponds to the value indicated by the RRC parameter B configured for a scheduled cell A, the DCI format is applicable for the scheduled cell A.

For example, if the base station 160 plans to assign a DCI format for a scheduled cell A to the UE 102, the base station 160 may transmit, to the UE 102, on the scheduling cell, a DCI format by setting the CIF value in the DCI format to the value indicated by the RRC parameter B configured for the scheduled cell A. If the UE 102 receives a DCI format on the scheduling cell and CIF value in the received DCI format corresponds to the value indicated by the RRC parameter B configured for a scheduled cell A, the UE 102 may determine the received DCI format is applicable for the scheduled cell A. The CIF value indicated by the RRC parameter B can be configured from 1 to 7.

Additionally, if the base station 160 plans to assign a DCI format for a scheduling cell to the UE 102, the base station 160 may transmit, to the UE 102, a DCI format by setting the CIF value in the DCI format to 0 on the scheduling cell. If the UE 102 receives a DCI format on the scheduling cell and CIF value in the received DCI format corresponds to 0, the UE 102 may determine the received DCI format is applicable for the scheduling cell.

The information received on 502 may also provide the UE 102 CORESET configuration and search space configuration for a scheduling cell. For example, the information may include one or more RRC parameters related to CORESET configuration (e.g. ControlResourceSetZero, ControlResourceSet) to configure a time and frequency control resource set in which to search for downlink control information on the scheduling cell. Additionally, the information may include one or more RRC parameters related to search space configuration (e.g. SearchSpace, searchSpaceZero) to define how and where to search for PDCCH candidates for a DCI format for a search space set on the scheduling cell. The ControlResourceSet configured for a scheduling cell may include a plurality of above-mentioned RRC parameters such as, ControlResourceSetId, frequencyDomainResource, duration, cce-REG-MappingType, precoderGranularity, tci-PresentInDCI, pdcch-DMRS-ScramblingID and so on. The SearchSpace configured for a scheduling cell may include a plurality of above-mentioned RRC parameters such as, searchSpaceId, controlResourceSetId, monitoringSlotPeriodicityAndOffset, duration, monitoringSymbolsWithinSlot, nrofCandidates, searchSpaceType.

The information received on 502 may also provide the UE 102 one or more RRC parameters related to search space configuration (e.g. SearchSpace) for a scheduled cell. The information received on 502 may not provide the UE CORESET configuration for a scheduled cell. Namely, the base station 160 may not transmit, to the UE 102, the CORESET configuration for a scheduled cell. The SearchSpace configured for a scheduled cell may include searchSpaceId, nrofCandidates and may not include other above-mentioned RRC parameters for a search space set.

For a UE 102 configured with cross-carrier scheduling, the UE 102 may, on an active DL BWP of a scheduling cell, monitor PDCCH candidates for DCI formats associated with a plurality of serving cells, which comprises of a scheduling cell and one or more scheduled cells. As above-mentioned in FIG. 2, the UE 102 may determine PDCCH monitoring occasions for monitoring PDCCH candidates according to the search space set configuration and associated CORESET configuration configured for the active DL BWP of the scheduling cell. More specifically, for each search space sets configured for the active DL BWP of the scheduling cell, the UE 102 may determine corresponding PDCCH monitoring occasions. The UE 102 may monitor PDCCH candidates of each search space sets in the determined corresponding PDCCH occasion in the associated CORESET on the active DL BWP of the scheduling cell.

Additionally, a search space set s configured for a scheduled cell are linked to a search space set s configured for a scheduling cell according to the search space set ID. In other words, for cross-carrier scheduling, the search space sets with the same search space ID in the scheduling cell and scheduling cell are linked to each other. The UE 102 may monitor PDCCH candidates of a search space set configured for a scheduled cell in those PDCCH monitoring occasions which are determined for the search space set with a same search space set ID configured for the scheduling cell.

Figure 6:
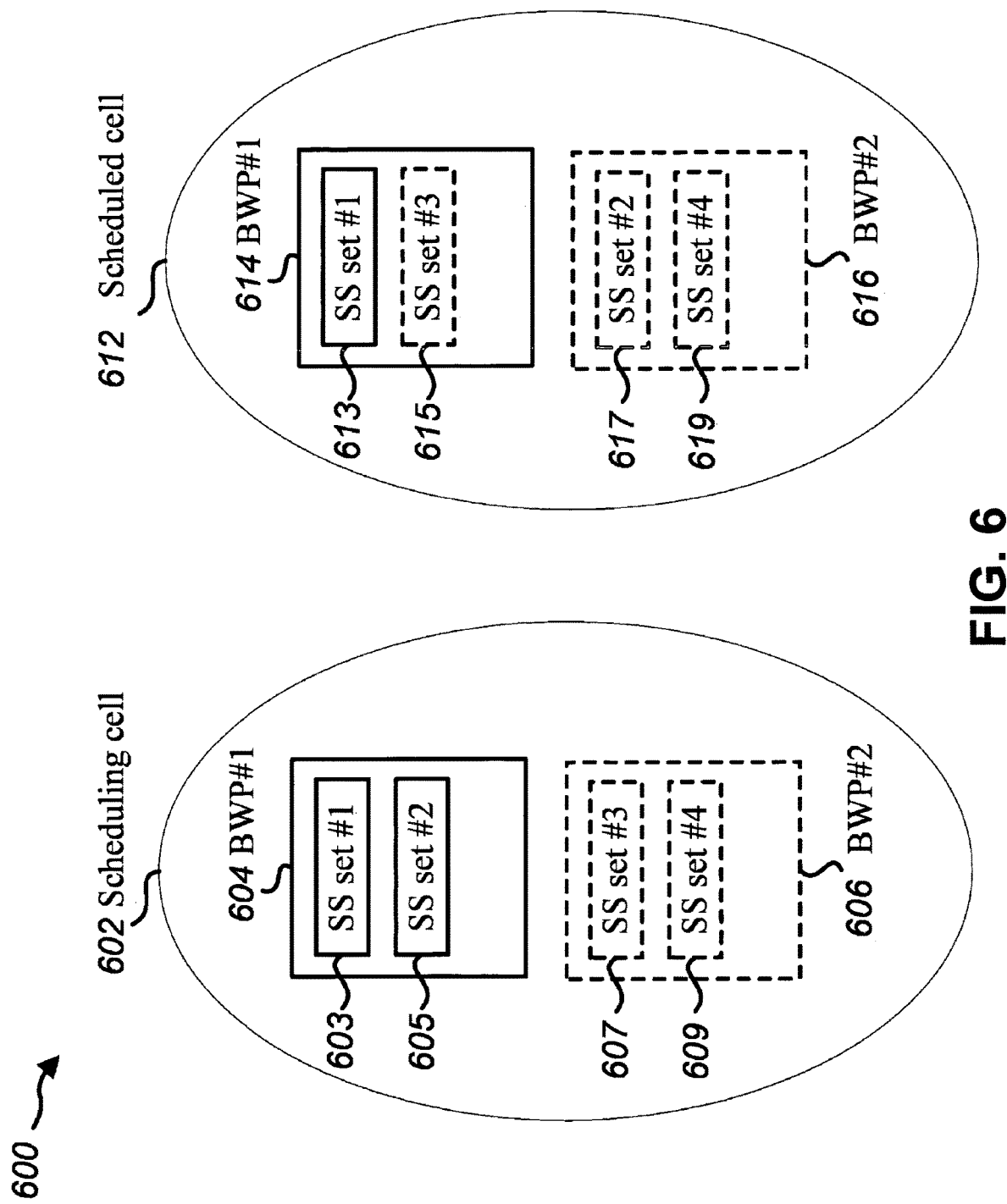
FIG. 6 is a diagram illustrating one example of 600 linked search space set for cross-carrier scheduling.

The UE 102 may monitor the PDCCH candidates of a search space set configured for the scheduled cell only if the DL BWPs in which search space set with the same search space ID are configured in scheduling cell and scheduled cell are both active. FIG. 6 is a diagram illustrating one example of 600 linked search space set for cross-carrier scheduling.

According to the FIG. 6, the UE 102 is configured by higher layers for a scheduling cell 602 two BWPs (a DL BWP #1 604 and a DL BWP #2 606). For DL BWP #1 604, two search space sets (a SS set #1 603 and a SS set #2 605) are configured. For DL BWP #2 606, two search space sets (a SS set #3 607 and a SS set #4 609) are configured. Furthermore, the UE 102 is configured by higher layers for a scheduled cell 612 two BWPs (a DL BWP #1 614 and a DL BWP #2 616). For DL BWP #1 614, two search space sets (a SS set #1 613 and a SS set #3 615) are configured. For DL BWP #2 616, two search space sets (a SS set #2 617 and a SS set #4 619) are configured. In the FIG. 6, the BWP #1 in the scheduling cell and the BWP #1 in the scheduled cell are configured as active DL BWP, respectively.

In the FIG. 6, the UE may monitor PDCCH candidates for the SS set #1 603 and the SS set #2 605 on the active DL BWP #1 604. On the other hand, the UE may monitor PDCCH candidates for the SS set #1 613 on the active DL BWP #1 604. However, for the SS set #3 615, there is not a linked SS set in the scheduling cell which has a same search space set ID with the SS set #3 615. In this case, the SS set #3 615 in the active DL BWP #1 614 can be regarded as an invalid search space set for cross-carrier scheduling. The UE thus may not monitor PDCCH candidates for the SS set #3 615 on the active DL BWP #1 604.

For the linked search space sets in the scheduling cell and the scheduled cell, the UE may monitor respective PDCCH candidates in a same PDCCH occasion in a same associated CORESET. As mentioned above, a USS at a CCE aggregation level is defined by a set of PDCCH candidates for the CCE aggregation. In other words, a USS at CCE AL L of a search space set corresponds to a set of CCE for the AL L corresponding to the PDCCH candidates of the search space set.

For a CCE AL L, the USS of a search space set s configured for different serving cell can be separated based on the respective CIF value. In other words, for a search space set s (e.g. a linked search space set) associated with a CORESET, a set of CCEs for PDCCH candidates of a first serving cell and a set of CCEs for PDCCH candidates of a second serving cell can be separated by respective CIF value of the first serving cell and the second serving cell. The set of CCEs in a CORESET for PDCCH candidates of a first serving cell is given at least based on the CIF value of the first serving cell. The set of CCEs in a CORESET for PDCCH candidates of a second serving cell is given at least based on the CIF value of the second serving cell.

The UE 102 may 504, based on the information received on 502, determine to monitor PDCCH candidates associated with one or more serving cells on the active DL BWP of the scheduling cell. For example, the UE 102 may monitor a first set of PDCCH candidates with a CCE aggregation level (AL) in a first set of CCEs in a CORESET for a first DCI format associated with a first serving cell wherein the first set of CCEs is given at least based on the CIF value of the first serving cell and the first DCI format having a first size is used for the scheduling of PUSCH. Herein, the first DCI format used for the scheduling of PUSCH may comprise of the first DCI format scheduling PUSCH transmission and/or the first DCI format releasing PUSCH transmission. The first DCI format releasing PUSCH transmission can be an uplink grant Type 2 scheduling release and/or the semi-persistent CSI release. In other words, the first DCI format having a first size can be a release DCI format. Moreover, the first DCI format having a first size can be a DCI format scheduling PUSCH transmission.

The UE 102 may 506, based on the information received on 502, determine to monitor a second set of PDCCH candidates with the CCE AL in a second set of CCEs in the CORESET for a second DCI format associated with a second serving cell wherein the second set of CCEs is given at least based on the CIF value of the second serving cell and the second DCI format has a second size. The second DCI format is a DCI format for-the scheduling of PUSCH. The second DCI format may be a DCI format used for scheduling PUSCH transmission. The second DCI format releasing the PUSCH transmission can be an uplink grant Type 2 scheduling release and/or the semi-persistent CSI release. Additionally or alternatively, the second DCI format may be used for releasing PUSCH transmission.

Herein, the CORESET on 504 and the CORESET on 506 are a same CORESET associated with a search space set (or a linked search space set). To be more specific, the CORESET herein may refer to as 'a PDCCH monitoring occasion for a search space set in a CORESET' in detail. That is, the CORESET on 504 and the CORESET on 506 may also refer to 'a same PDCCH monitoring occasion in the CORESET'.

At 508, the UE 102 may transmit, to the base station 160, a capability to indicate support of search space sharing for operation of carrier aggregation so that the UE can receive a PDCCH through a PDCCH candidate for the second DCI format in the first set of CCEs in a case that the first size and the second size are some. If the UE 102 can receive a PDCCH through a PDCCH candidate for the second DCI format in the first set of CCEs in a case that the first size and the second size are same.

In an example A of the search space sharing implementation, the first DCI format and the second DCI format can be a same DCI format other than DCI format 0_0. Both the first DCI format and the second DCI format can be a DCI format 0_1. Alternatively, both the first DCI format and the second DCI format can be a DCI format 0_2. For example, the first DCI format is a DCI format 0_1. In this case, the second DCI format is the DCI format 0_1. In a case that the first DCI format is a DCI format 0_2, the second DCI format is the DCI format 0_2. That is, at 508, the UE 102 can receive a PDCCH through a PDCCH candidate for a DCI format as same as the first DCI format in the first set of CCEs in a case that the first size and the second size are same. The DCI format herein is a DCI format of a search space set in the second serving cell.

In the example A, for a UE configured to monitor PDCCH candidates for DCI format 0_1 of a search space set in a serving cell and monitor PDCCH candidates for DCI format 0_2 of another search space set in another serving cell, even if the DCI format 0_2 has a same size with DCI format 0_1, the UE 102 may not receive a PDCCH through a PDCCH candidate for a DCI format 0_2 (or for a DCI format 0_1) associated with the second serving cell in the first set of CCEs where the UE 102 receives a DCI format 0_1 (or a DCI format 0_2) associated with the first serving cell. In other words, in this case, the base station 160 may not transmit, to the UE 102, a PDCCH through a PDCCH candidate for a DCI format 0_2 associated with the second serving cell in the first set of CCEs where the base station 160 transmits a DCI format 0_1 associated with the first serving cell.

Additionally, in the example A, the UE 102, may transmit, to the base station 160, a capability A which indicates the UE 102 can monitor PDCCH candidates for DCI format 0_1 and DCI format 0_2 in a same search space set s in a same serving cell. For the UE 102, the DCI format 0_1 may not have a same size with the DCI format 0_2 if these two DCI formats are in a same search space set in a same serving cell. However, there is a possibility that the DCI format 0_1 associated with a serving cell may have a same size with DCI format 0_2 associated with another serving cell. For example, in this case, even if the DCI format 0_2 has a same size with DCI format 0_1, the UE 102 may not receive a PDCCH through a PDCCH candidate for a DCI format 0_2 (or for a DCI format 0_1) associated with the second serving cell in the first set of CCEs where the UE 102 receives a DCI format 0_1 (or a DCI format 0_2) associated with the first serving cell. The base station can also avoid this case that the DCI format 0_1 associated a serving cell has a same size with the DCI format 0_2 associated with another serving cell by adding one or more zero-padding bits or RRC configuration.

In an example B of the search space sharing implementation, the first DCI format and the second DCI format can correspond to different DCI formats other than DCI format 0_0. The first DCI format can be a DCI format 0_1 while the second DCI format can be a DCI format 0_2. On the other hand, the first DCI format can be a DCI format 0_2 while the second DCI format can be a DCI format 0_1. In this case, the carrier indicator field of the DCI format 0_2 are configured as 3 bits. In other words, the UE 102 may receive a PDCCH through a PDCCH candidate for the second DCI format in the first set of CCEs in a case that the first size and the second size are same and both the carrier indicator field of the first DCI format and the carrier indicator field of the second DCI format are configured as a same bit size (for example, 3 bits) wherein the first DCI format and second DCI format correspond to different DCI formats as mentioned above.

On the other hand, in the example B, if the carrier indicator field of DCI format 0_2 is configured to a size other than 3 bits, the DCI format 0_2 cannot be used for the search space sharing even if the DCI format 0_2 and DCI format 0_1 have a same size. That is, for the first DCI format and second DCI format, which has different size of the carrier indicator field from each other, the UE 102 may not receive a PDCCH through a PDCCH candidate for the second DCI format in the first set of CCEs even if the first DCI format and the second DCI format have a same DCI size wherein the first DCI format and second DCI format corresponds to different DCI formats as mentioned above. In this case, the UE 102 may not differentiate that a received DCI format in the first set of CCEs is a first DCI format associated with the first serving cell or a second DCI format associated with the second serving cell. Similarly with the example A, DCI format 0_1 and DCI format 0_2 in a same search space set s in a same serving cell may not have a same DCI size.

In the implementation, the first serving cell may be a scheduling cell and the second serving cell may be a scheduled cell. Additionally or alternatively, the first serving cell may be a scheduled cell and the second serving cell may be a scheduling cell. Additionally or alternatively, both the first serving cell and the second serving cell may be the scheduled cells.

Figure 7:
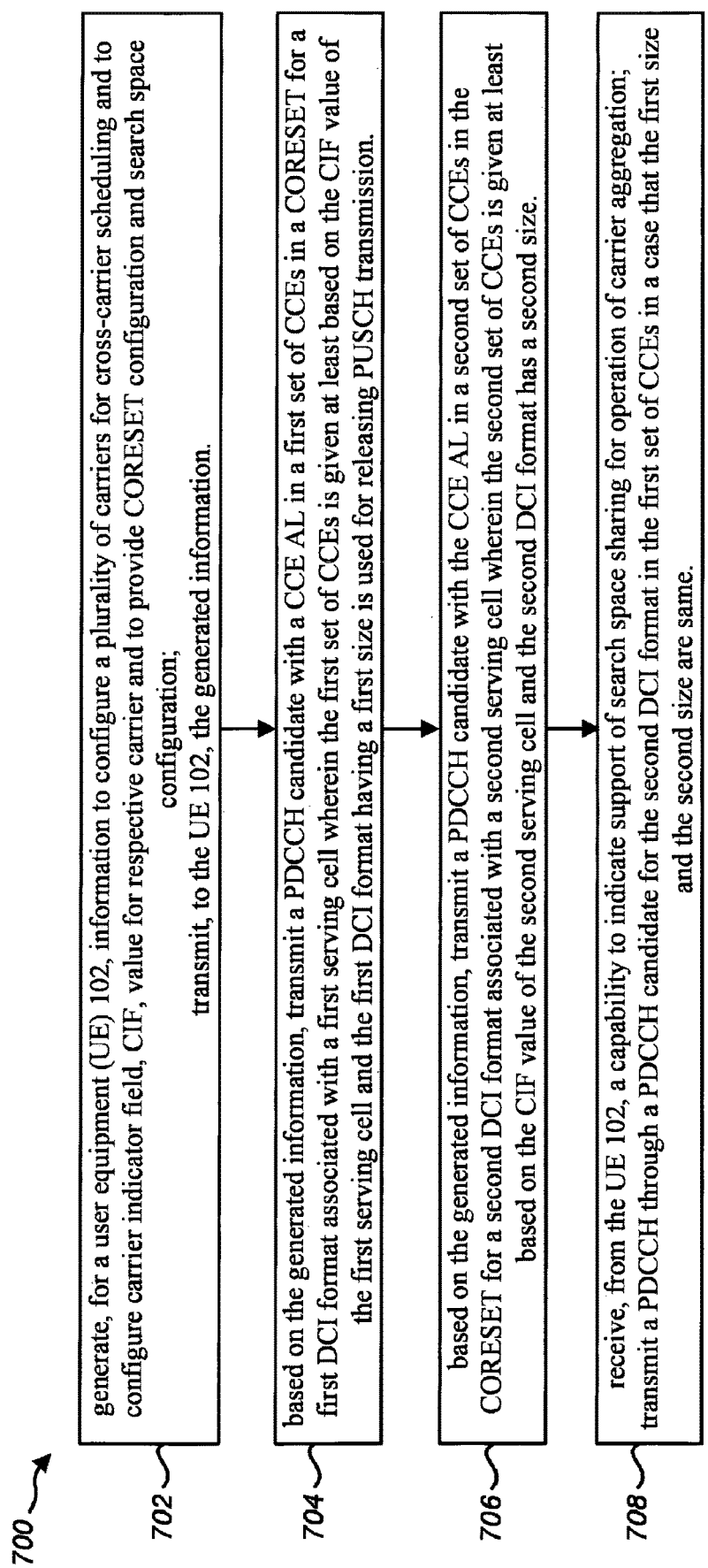
FIG. 7 is a flow diagram illustrating one implementation of a method 700 for search space sharing for cross-carrier scheduling by a base station 160.

FIG. 7 is a flow diagram illustrating one implementation of a method 700 for search space sharing for cross-carrier scheduling by a base station 160.

The base station 160 may generate 702, for the UE 102, information. The information may be included in the MIB (or SIB) which is broadcasted by the base station 160. Additionally or alternatively, the information may be one or more RRC parameters included in a RRC message. The base station 160 may transmit 702, to the UE 102, the generated information.

The information generated on 702 may configure the UE 102 a plurality of serving cells for operation of carrier aggregation. The information generated on 702 may further configure the UE 102 for cross-carrier scheduling and configure carrier indicator field (CIF) value for respective configured carrier. The information generated on 702 may also provide the UE 102 CORESET configuration and search space configuration for a scheduling cell. The information generated on 702 may also provide the UE 102 search space configuration for a scheduled cell. The information generated on 702 may not provide the UE 102 CORESET configuration for a scheduled cell.

The base station 160 may, based on the information transmitted on 702, transmit PDCCH candidates associated with one or more serving cells on the active DL BWP of the scheduling cell. The base station 160 may 704, based on the information transmitted on 702, transmit, to the UE 102, a PDCCH candidate with a CCE aggregation level (AL) in a first set of CCEs in a CORESET for a first DCI format associated with a first serving cell wherein the first set of CCEs is given at least based on the CIF value of the first serving cell and the first DCI format having a first size is used for the scheduling of PUSCH. The first DCI format used for the scheduling of PUSCH includes the first DCI format scheduling PUSCH transmission and/or the first DCI format releasing PUSCH transmission.

The base station 160 may 706, based on the information transmitted on 702, transmit, to the UE 102, a PDCCH candidate with the CCE aggregation level (AL) in a second set of CCEs in the CORESET for a second DCI format associated with a second serving cell wherein the second set of CCEs is given at least based on the CIF value of the second serving cell and the second DCI format has a second size. The second DCI format is used for the scheduling of PUSCH. The second DCI format used for the scheduling of PUSCH includes the second DCI format scheduling PUSCH transmission and/or the second DCI format releasing PUSCH transmission.

At 708, the base station 160 may receive, from the UE 102, a capability to indicate support of search space sharing for operation of carrier aggregation so that the UE 102 can receive a PDCCH through a PDCCH candidate for the second DCI format in the first set of CCEs in a case that the first size and the second size are same. If the base station 160 received the capability from the UE 102, the base station 160 may transmit a PDCCH through a PDCCH candidate for the second DCI format in the first set of CCEs in a case that the first size and the second size are same.

Figure 8:
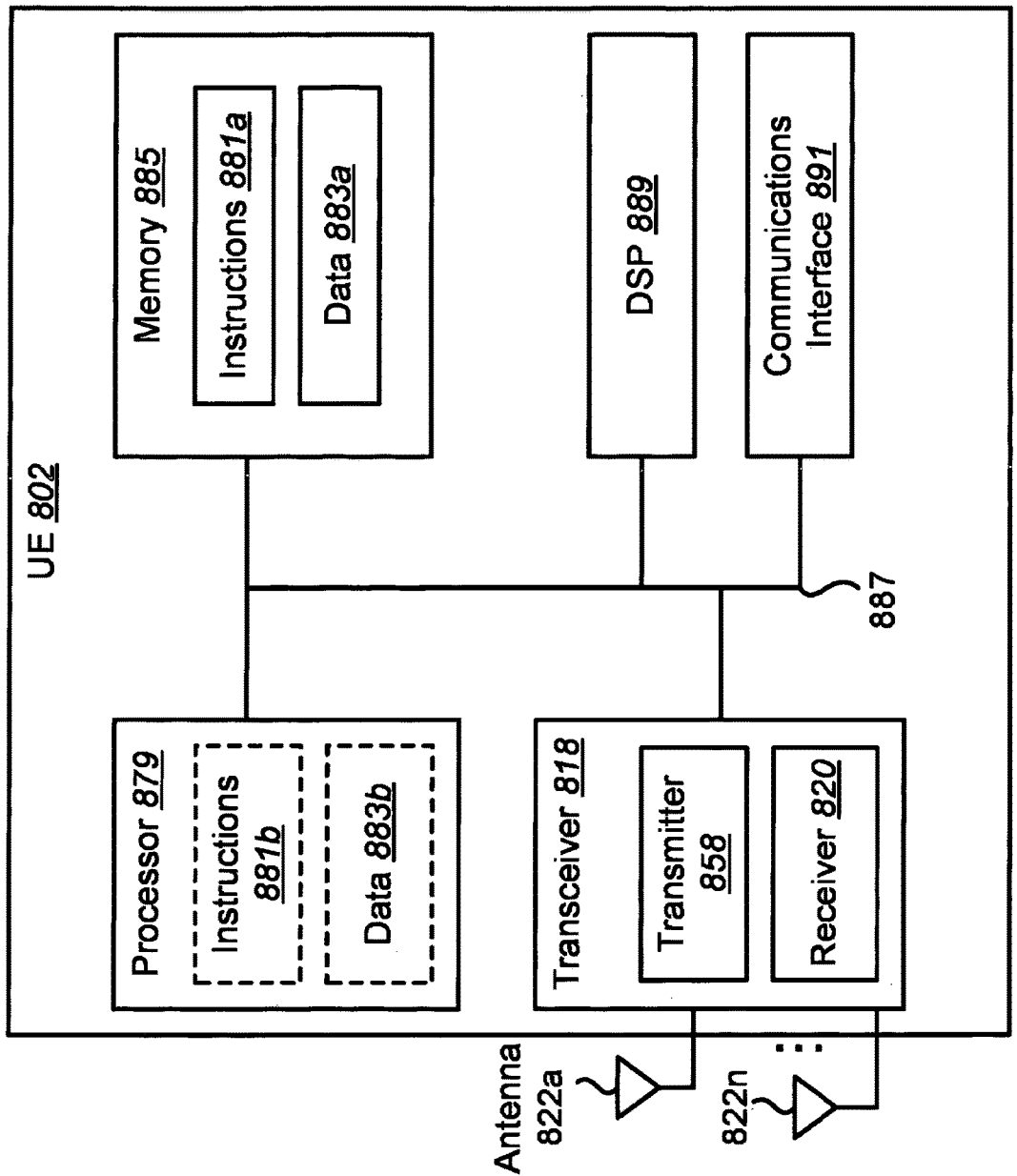
FIG. 8 illustrates various components that may be utilized in a UE.

FIG. 8 illustrates various components that may be utilized in a UE 802. The UE 802 described in connection with FIG. 8 may be implemented in accordance with the UE 102 described in connection with FIG. 1. The UE 802 includes a processor 881 that controls operation of the UE 802. The processor 881 may also be referred to as a central processing unit (CPU). Memory 887, which may include read-only memory (ROM), random access memory (RAM), a combination of the two or any type of device that may store information, provides instructions 883a and data 885a to the processor 881. A portion of the memory 887 may also include non-volatile random access memory (NVRAM). Instructions 883b and data 885b may also reside in the processor 881. Instructions 883b and/or data 885b loaded into the processor 881 may also include instructions 883a and/or data 885a from memory 887 that were loaded for execution or processing by the processor 881. The instructions 883b may be executed by the processor 881 to implement one or more of the methods 200 described above.

The UE 802 may also include a housing that contains one or more transmitters 858 and one or more receivers 820 to allow transmission and reception of data. The transmitter(s) 858 and receiver(s) 820 may be combined into one or more transceivers 818. One or more antennas 822a-n are attached to the housing and electrically coupled to the transceiver 818.

The various components of the UE 802 are coupled together by a bus system 889, which may include a power bus, a control signal bus and a status signal bus, in addition to a data bus. However, for the sake of clarity, the various buses are illustrated in FIG. 8 as the bus system 889. The UE 802 may also include a digital signal processor (DSP) 891 for use in processing signals. The UE 802 may also include a communications interface 893 that provides user access to the functions of the UE 802. The UE 802 illustrated in FIG. 8 is a functional block diagram rather than a listing of specific components.

Figure 9:
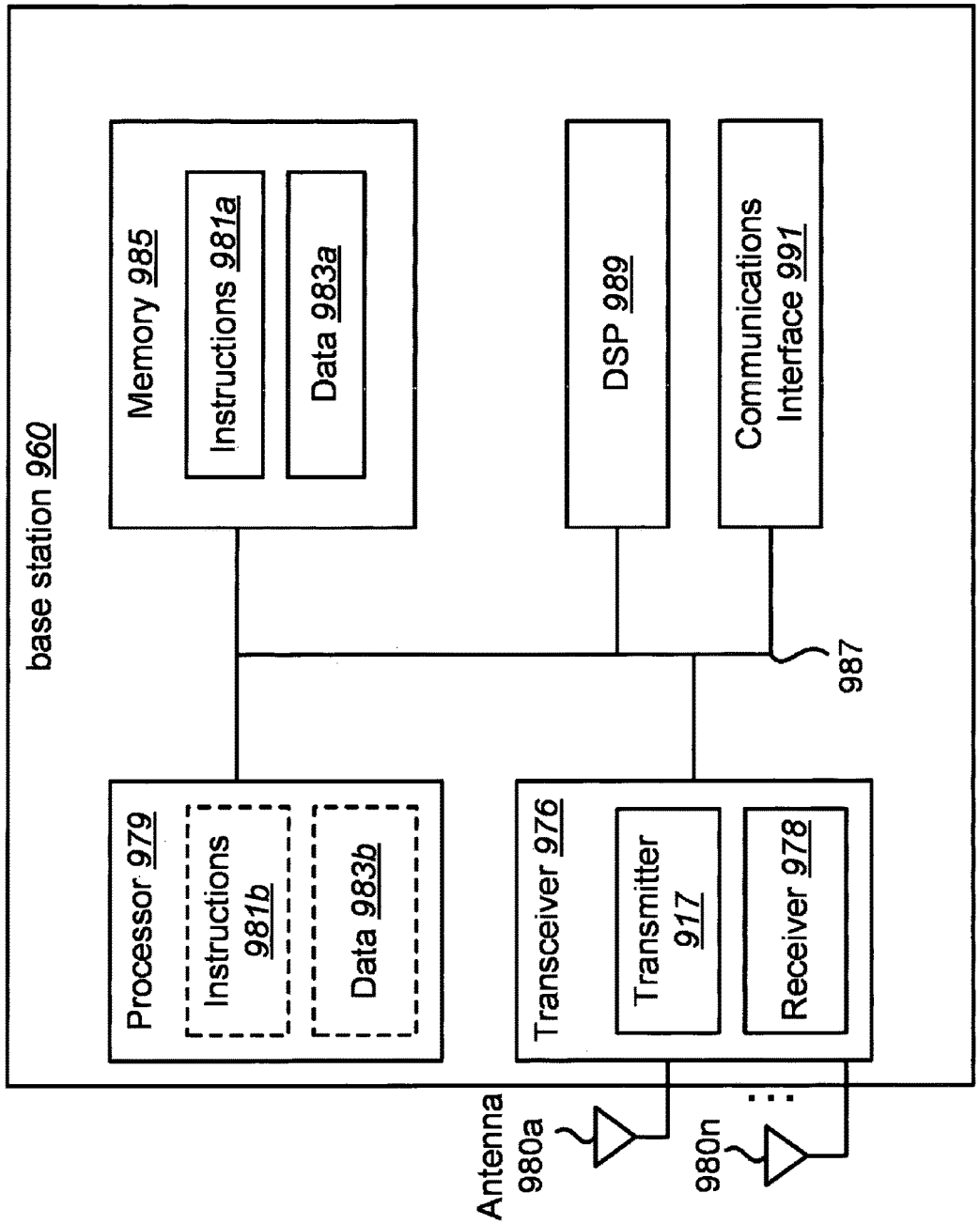
FIG. 9 illustrates various components that may be utilized in a base station.

FIG. 9 illustrates various components that may be utilized in a base station 960. The base station 960 described in connection with FIG. 9 may be implemented in accordance with the base station 160 described in connection with FIG. 1. The base station 960 includes a processor 981 that controls operation of the base station 960. The processor 981 may also be referred to as a central processing unit (CPU). Memory 987, which may include read-only memory (ROM), random access memory (RAM), a combination of the two or any type of device that may store information, provides instructions 983a and data 985a to the processor 981. A portion of the memory 987 may also include non-volatile random access memory (NVRAM). Instructions 983b and data 985b may also reside in the processor 981. Instructions 983b and/or data 985b loaded into the processor 981 may also include instructions 983a and/or data 985a from memory 987 that were loaded for execution or processing by the processor 981. The instructions 983b may be executed by the processor 981 to implement one or more of the methods 300 described above.

The base station 960 may also include a housing that contains one or more transmitters 917 and one or more receivers 978 to allow transmission and reception of data. The transmitter(s) 917 and receiver(s) 978 may be combined into one or more transceivers 976. One or more antennas 980*a-n* are attached to the housing and electrically coupled to the transceiver 976.

The various components of the base station 960 are coupled together by a bus system 989, which may include a power bus, a control signal bus and a status signal bus, in addition to a data bus. However, for the sake of clarity, the various buses are illustrated in FIG. 9 as the bus system 989. The base station 960 may also include a digital signal processor (DSP) 991 for use in processing signals. The base station 960 may also include a communications interface 993 that provides user access to the functions of the base station 960. The base station 960 illustrated in FIG. 9 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using circuitry, a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. A user equipment (UE), comprising:
reception circuitry configured to receive, from a base station, Radio Resource Control RRC) parameters to configure a scheduling cell and at least one scheduled cell for cross-carrier scheduling and to configure a carrier indicator field (CIF) value for a respective cell; and
control circuitry configured to:
monitor a first set of physical downlink control channel (PDCCH) candidates with a control channel element (CCE) aggregation level (AL) in a first set of CCEs in a control resource set (CORESET) for a first downlink control information (DCI) format associated with a first serving cell, wherein the first set of CCEs is given at least based on a CIF value of the first serving cell, and the first DCI format has a first size, and
monitor a second set of PDCCH candidates with a CCE AL in a second set of CCEs in the CORESET for a second DCI format associated with a second serving cell, wherein the second set of CCEs is given at least based on a CIF value of the second serving cell, and the second DCI format has a second size and is used for an uplink grant Type 2 physical uplink shared channel (PUSCH) release, wherein
in a case that the first size and the second size are equal, the control circuitry is further configured to receive a PDCCH through a PDCCH candidate with the CCE AL for the second DCI format in the first set of CCEs.

2. A base station, comprising:
transmission circuitry configured to:
transmit, to a user equipment (UE), Radio Resource Control (RRC) parameters to configure a scheduling cell and at least one scheduled cell for cross-carrier scheduling and to configure a carrier indicator field (CIF) value for a respective cell,
transmit a first physical downlink control channel (PDCCH) candidate with a control channel element (CCE) aggregation level (AL) in a first set of CCEs in a control resource set (CORESET) for a first downlink control information (DCI) format associated with a first serving cell, wherein the first set of CCEs is given at least based on a CIF value of the first serving cell, and the first DCI format has a first size, and
transmit a second PDCCH candidate with a CCE AL in a second set of CCEs in the CORESET for a second DCI format associated with a second serving cell, wherein the second set of CCEs is given at least based on a CIF value of the second serving cell, and the second DCI format has a second size and is used for an uplink grant Type 2 physical uplink shared channel (PUSCH) release, wherein
in a case that the first size and the second size are equal, the transmission circuitry is further configured to transmit a PDCCH through a PDCCH candidate with the CCE AL for the second DCI format in the first set of CCEs.

3. A method performed by a user equipment (UE), the method comprising:
receiving, from a base station, Radio Resource Control (RRC) parameters to configure a scheduling cell and at least one scheduled cell for cross-carrier scheduling and to configure a carrier indicator field (CIF) value for a respective cell;
monitoring a first set of physical downlink control channel (PDCCH) candidates with a control channel element (CCE) aggregation level (AL) in a first set of CCEs in a control resource set (CORESET) for a first downlink control information (DCI) format associated with a first serving cell, wherein the first set of CCEs is given at least based on a CIF value of the first serving cell, and the first DCI format has a first size;
monitoring a second set of PDCCH candidates with a CCE AL in a second set of CCEs in the CORESET for a second DCI format associated with a second serving cell, wherein the second set of CCEs is given at least based on a CIF value of the second serving cell, and the second DCI format has a second size and is used for an uplink grant Type 2 physical uplink shared channel (PUSCH) release; and in a case that the first size and the second size are equal, receiving a PDCCH through a PDCCH candidate with the CCE AL for the second DCI format in the first set of CCEs.

* * * * *